(12) United States Patent
Boia et al.

(10) Patent No.: US 9,720,814 B2
(45) Date of Patent: Aug. 1, 2017

(54) TEMPLATE IDENTIFICATION FOR CONTROL OF TESTING

(71) Applicant: Microsoft Technology Licensing, LLC, Redmond, WA (US)

(72) Inventors: Dragos D. Boia, Seattle, WA (US); Viresh Ramdatmisier, Seattle, WA (US); Jiong Qiu, Sammamish, WA (US); Barry Markey, Kirkland, WA (US); Alisson A. S. Sol, Bellevue, WA (US); Donald J. Ankney, Seattle, WA (US); Eugene V. Bobukh, Kirkland, WA (US); Robert D. Fish, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 14/719,834

(22) Filed: May 22, 2015

(65) Prior Publication Data

US 2016/0342500 A1    Nov. 24, 2016

(51) Int. Cl.
*G06F 11/00* (2006.01)
*G06F 11/36* (2006.01)
(Continued)

(52) U.S. Cl.
CPC ...... *G06F 11/3684* (2013.01); *G06F 11/3688* (2013.01); *G06F 17/30887* (2013.01); *G06F 21/552* (2013.01); *G06F 2221/2119* (2013.01)

(58) Field of Classification Search
CPC ............. G06F 11/3684; G06F 11/3688; G06F 11/3676; G06F 17/30887; G06F 21/577; H04L 29/06877
See application file for complete search history.

(56) References Cited

U.S. PATENT DOCUMENTS 7,231,606 B2    6/2007  Miller et al.
7,444,548 B2    10/2008  Shane
(Continued)

FOREIGN PATENT DOCUMENTS

CN    101471818    7/2009
CN    102073670    5/2011

OTHER PUBLICATIONS

Di Lucca, Giuseppe Antonion, et al., An Approach to Identify Duplicated Web Pages, 2002, IEEE, pp. 1-6.*

(Continued)

*Primary Examiner* — Marc Duncan
(74) *Attorney, Agent, or Firm* — Lee & Hayes, PLLC

(57) ABSTRACT

Template identification techniques for control of testing are described. In one or more implementations, a method is described to control testing of one or more services by one or more computing devices using inferred template identification. Templates are inferred, by the one or more computing devices, that are likely used for documents for respective services of a service provider that are available via corresponding universal resource locators (URLs) to form an inferred dataset. Overlaps are identified by the one or computing devices in the inferred dataset to cluster services together that have likely used corresponding templates. Testing is controlled by the one or more computing devices of the one or more services based at least in part on the clusters.

18 Claims, 19 Drawing Sheets

(51) Int. Cl.
*G06F 17/30* (2006.01)
*G06F 21/55* (2013.01)

(56) References Cited

U.S. PATENT DOCUMENTS

| | | | |
|---|---|---|---|
| 7,561,734 | B1 | 7/2009 | Wnek |
| 7,660,804 | B2 | 2/2010 | Wen et al. |
| 7,690,037 | B1 | 3/2010 | Hartmann |
| 7,698,317 | B2* | 4/2010 | Sasturkar ............ G06F 17/2211 707/609 |
| 7,987,417 | B2 | 7/2011 | Chakrabarti et al. |
| 8,015,239 | B2 | 9/2011 | Sharma et al. |
| 8,587,613 | B2 | 11/2013 | Wang et al. |
| 2005/0251863 | A1* | 11/2005 | Sima ..................... G06F 21/577 726/25 |
| 2008/0010292 | A1* | 1/2008 | Poola .................. G06F 17/2211 |
| 2008/0120305 | A1* | 5/2008 | Sima ..................... G06F 21/577 |
| 2009/0259649 | A1 | 10/2009 | Poola |
| 2009/0265611 | A1 | 10/2009 | Sengamedu et al. |
| 2010/0083095 | A1 | 4/2010 | Nikovski et al. |
| 2012/0030516 | A1* | 2/2012 | De Keukelaere ... G06F 11/3684 714/38.1 |
| 2013/0091118 | A1* | 4/2013 | Ajoku ............... G06F 17/30887 707/709 |
| 2014/0283052 | A1 | 9/2014 | Jordan et al. |
| 2015/0128280 | A1* | 5/2015 | Messer ............... H04L 63/1433 726/25 |
| 2016/0127410 | A1* | 5/2016 | Borohovski .......... G06F 21/577 726/1 |
| 2016/0306893 | A1* | 10/2016 | Zhou ................. G06F 17/30864 |

OTHER PUBLICATIONS

Carle et al., "Network Attack Detection and Defense—Manifesto of the Dagstuhl Perspective Workshop, Mar. 2-6, 2008," In Computer Science—Research and Development, vol. 23, No. 1, Feb. 24, 2009, pp. 15-25.

Kruegel et al., "A Multi-Model Approach to the Detection of Web-Based Attacks," In Computer Networks, vol. 48, No. 5, Aug. 5, 2005, pp. 717-738.

Kumar, "Survey of Current Network Intrusion Detection Techniques," retrieved from <<http://www.cse.wustl.edu/~jain/cse571-07/ftp/ids/>> Dec. 21, 2007, 17 pages.

Madbouly et al., "Relevant Feature Selection Model Using Data Mining for Intrusion Detection System," In International Journal of Engineering Trends and Technology (IJETT), vol. 9, No. 10, Mar. 25, 2014, 12 pages.

International Search Report & Written Opinion Issued in PCT Application No. PCT/US2016/033379, mailed Jul. 12, 2016, 13 pages.

Foschini,"A Fast and Parameter-Free Template Detection Method for Web Pages and Online Newspapers", In Proceedings: In PHD Thesis, Scuola Superiore Sant'Anna, Classe Accademica di Scienze Sperimentali, Settore di Ingegneria Available at: <http://lucafoschini.com/papers/Specialistica.pdf>, Feb. 27, 2007, 31 pages.

Kolcz,"Site-Independent Template-Block Detection", In Proceedings of Lecture Notes in Computer Science, vol. 4702 Available at: <http://research.microsoft.com/pubs/73712/KolczYih-PKDD07.pdf>, 2007, 12 pages.

Su-Bin,"(Missing Complete Article) a Direct Web Page Templates Detection Method", In Proceedings of International Conference on Internet Technology and Applications, Aug. 16, 2011, 4 pages.

Vieira,"A Fast and Robust Method for Web Page Template Detection and Removal", In Proceedings of the ACM CIKM International Conference on Information and Knowledge Management Available at: <http://bigdata.poly.edu/~juliana/pub/CIKM630-vieira.pdf>, Nov. 5, 2006, 10 pages.

Wang,"Incremental Web Page Template Detection", In Proceedings of the 17th International Conference on World Wide Web Available at: <http://wwwconference.org/www2008/papers/pdf/p1247-wang.pdf>, Apr. 24, 2008, 2 pages.

\* cited by examiner

```
<MetaDomainsDescriptor>
<Domain Name="bing">
    <TopLevelDomain>bing.com</TopLevelDomain>
    <Object Name="algo results">
        <Extractor Operator="UnionAll">
            <xPath><![CDATA[//li[@class='algo_results']]></xPath>
        </Extractor>
        <Feature Name="algo results instances info">
            <Action>CountInstances</Action>
            <Action>GetInstancesOrder</Action>
        </Feature>
        <Feature Name="algo results color and position">
            <Action>GetColor</Action>
            <Action>GetPagePosition</Action>
        </Feature>
    </Object>
</Domain>
</MetaDomainsDescriptor>
```

Fig. 2a

```
<Matrices>
    <MatrixExecution Name="bing matrix execution">
        <EndPoint>
            <![CDATA[http://www.bing.com/
search?q=##query##&mkt=##market##]]>
        </EndPoint>
    </MatrixExecution>
    <!-- Cross join parameters -->
    <Parameters>
        <Parameter Name="query">
            <Value>microsoft</Value>
            <Value>johann sebastian bach</Value>
        </Parameter>
        <Parameter Name="market">
            <Value>en-US</Value>
            <Value>en-GB</Value>
        </Parameter>
    </Parameters>
</Matrices>
```

Fig. 2b

TEMPLATE IDENTIFICATION FOR CONTROL OF TESTING

BACKGROUND

Organizations with a large number of computers that run several different services typically monitor both hardware and software events for anomalies that can indicate security threats. To date, operational security assurance procedures are typically based on rules that analyze events for pre-defined patterns. For example, the rules may be run against logs of each computer. The pre-defined patterns can indicate a potential security threat which, once identified, can be addressed. This rule-based approach can fail to scale in at least two dimensions, thus rendering the approach difficult to flexibly implement. First, regarding rule-based implementations, such requires coding of the rules ahead of time, based on expert knowledge. This means that rule developers have to anticipate what is sought as a vulnerability. Rule developers may not, however, be knowledgeable of all potential vulnerabilities, thus leaving gaps in the approach. Second, during operation, the rule-based approach demands full scanning of all events, seeking for patterns in data or information that may have incomplete or incorrect data.

Additionally, online content portals may use a small number of templates to publish a large amount of content. In this way, the online content portals may minimize an amount of code involved to provide services, which improves efficiency in making these services available. However, conventional scanners and test tools typically do not have insight into server-side code and thus these conventional techniques are forced to treat each template page as an individual codebase because of differences in content. This leads to significant duplicate testing of the underlying code and corresponding inefficiencies and resource consumption.

SUMMARY

Template identification techniques for control of testing are described. In one or more implementations, a method is described to control testing of one or more services by one or more computing devices using inferred template identification. Templates are inferred, by the one or more computing devices, that are likely used for documents for respective services of a service provider that are available via corresponding universal resource locators (URLs) to form an inferred dataset. Overlaps are identified by the one or computing devices in the inferred dataset to cluster services together that have likely used corresponding templates. Testing is controlled by the one or more computing devices of the one or more services based at least in part on the clusters.

In one or more implementations, a service testing system includes a template inference module implemented at least partially in hardware. The template inference module is configured to infer templates that are likely used for documents for respective services of a service provider that are available via corresponding universal resource locators (URLs) to form an inferred dataset. The template inference module is also configured to identify overlaps by the one or computing devices in the inferred dataset to cluster services together that have likely used corresponding templates. A synthetic test generator is configured to control testing of the one or more services based at least in part on the clusters.

In one or more implementations, a computing device infers template usage by services for use in testing. The computing device includes one or more processors and one or more computer-readable storage media comprising instructions stored thereon that, responsive to execution by the one or more processors, causes the one or more processors to perform operations. The operations include applying template inference techniques to symbolically represent likely templates used by respective services of a service provider to infer templates that are likely used for documents for the respective services that are available via corresponding universal resource locators (URLs) to form an inferred dataset. The operations also include identifying overlaps in the inferred dataset to cluster services together that have likely used corresponding templates and removing one or more duplicates from the inferred dataset based on the identified overlaps to form a de-duplicated dataset to be used to test the services.

This Summary is provided to introduce a selection of concepts in a simplified form that are further described below in the Detailed Description. This Summary is not intended to identify key features or essential features of the claimed subject matter.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

FIG. 2a illustrates modeling a meta-domain descriptor as xml data in accordance with one implementation.

FIG. 2b illustrates modeling a matrix execution as xml data in accordance with one implementation.

DETAILED DESCRIPTION

Overview

Figure 1:
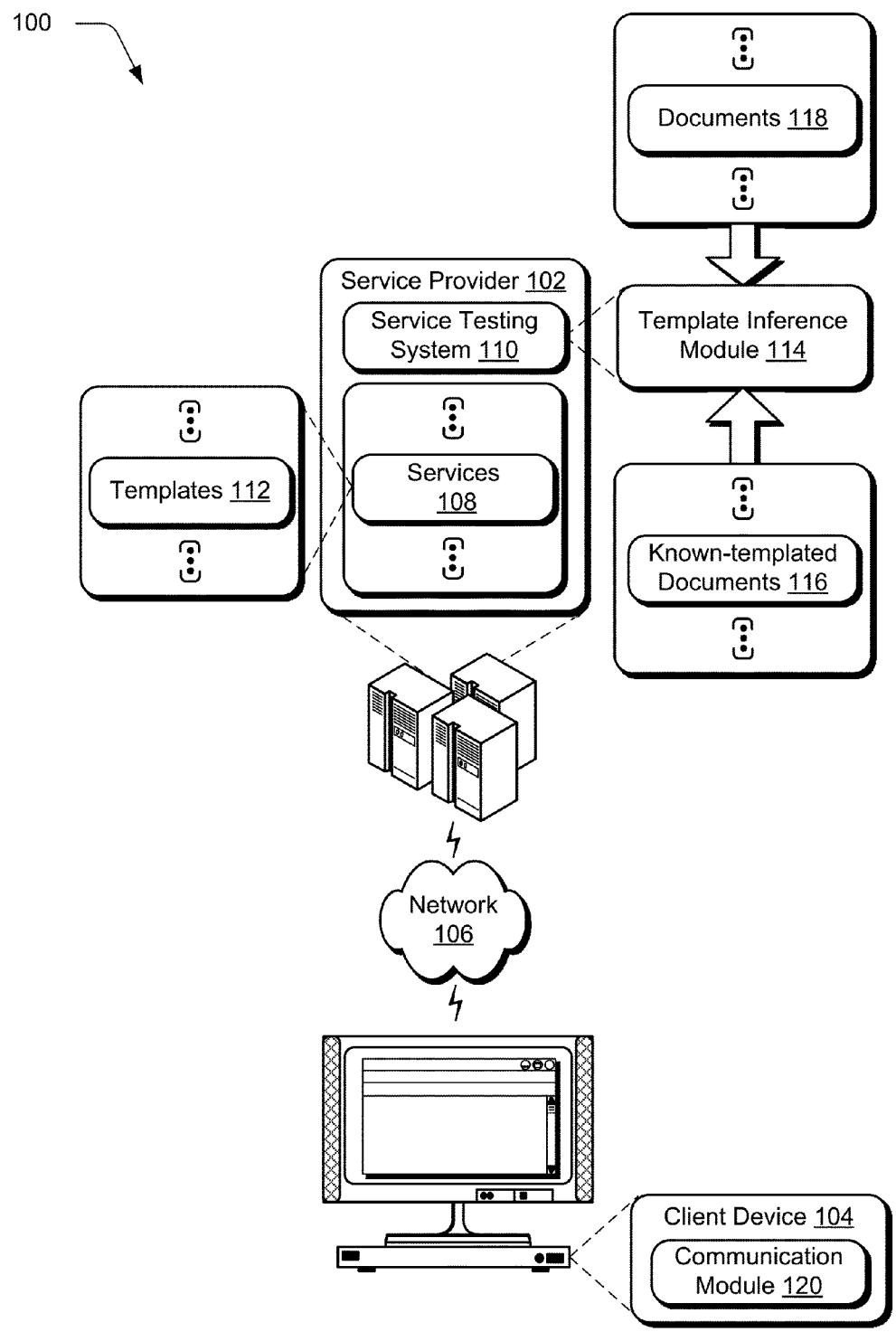
FIG. 1 illustrates an example operating environment in accordance with one or more implementations that is operable to infer template usage in support of testing.

Online content portals may use a small number of templates to publish a large amount of content in documents. In this way, the online content portals may minimize an amount of code involved to provide services by not having to recreate a structure used by the document to present the content. However, conventional scanners and test tools may not have insight into server-side code and thus these conventional techniques are forced to treat each document provided by the portal as an individual codebase because of differences in content, which leads to significant duplicate testing of the underlying code.

One example conventional solution used to address these issues involves manual creation of "template signatures" that are specific to an individual service or application. Accordingly, a conventional test engine or scanner must be specifically tuned to recognize these signatures, e.g., to look for known schemas or matching via known regular expressions. In another conventional example, templates are modified to include hints to a test engine or scanner. Thus, the test engine or scanner must still be specifically tuned to recognize these hints and requires specialized coding on the part of a service provider that provides the service. This includes mechanisms that involve inclusion of a custom header or placing an identified in comments or other non-rendered code.

There are a variety of limitations to these conventional techniques. For example, these conventional techniques require pre-shared information in order to tune. As a result, a tester must have specialized knowledge of the service/templates and the test engine or scanner in order to be tuned to support the testing. Another limitation is scale. Both of the conventional approaches require human effort for each new template, which at some point this human effort may add up to a significant cost measured in both direct labor cost and increased time to market for new code.

Accordingly, techniques are described to support template identification for control of testing. In one or more implementations, the techniques involve first applying a template inference algorithm to two data sets: a set of known templated content (e.g., documents) and a set of documents obtained from services, e.g., webpages. The output symbolically represents and infers the template used, independent of the content of the documents. This creates an inferred dataset.

Next, machine learning techniques are applied to the inferred dataset. By using the known template documents as a ground truth, this technique may determine where the templates overlap to identify duplicates, which may then be removed. The de-duplicated dataset is then fed to a scanner for testing. Optionally, some duplicate templates may also be fed to the scanner as well as part of a quality validation step, e.g., a template has the same test results as its duplicates, no matter what the content differences between two documents. Matched and mismatched results may also be fed back into the system to continuously improve the accuracy of the techniques.

Through identification of the duplicates, a number of documents processed to test services may be reduced. For example, clusters of like templates may be formed and a subset of the documents may be selected from the cluster for testing. In this way, an amount of testing may be reduced and efficiency of the system improved, further discussion of which may be found in relation to the following figures.

In the discussion that follows, a section entitled "Example Environment" describes an example environment in which the various embodiments can be utilized. Next, a section entitled "Example Schemas" describes an example schema that can be utilized in connection with various embodiments. Following this, a section entitled "Training a Recognizer" describes embodiments in which a recognizer can be initially trained for deployment in accordance with one or more embodiments. Next, a section entitled "Behavior Change Analysis for Services—Example" described but one approach that can be used to conduct behavior change analysis in accordance with one embodiment. Next, a section entitled "In Operation" describes operational aspects of a deployed recognizer and an iterative machine learning process in accordance with one or more embodiments. Following this, a section entitled "Relating the System to the Schema" provides a diagrammatic representation of how an example schema, described below, relates to the described system. A section titled "Template Identification for Control of Testing" follows. Next, a section entitled "Example Methods" describes example methods in accordance with one or more embodiments. Last, a section entitled "Example Device" describes an example device in accordance with one or more embodiments.

Example Environment

FIG. 1 is an illustration of an environment 100 in an example implementation that is operable to employ the techniques described herein. The illustrated environment 100 includes a service provider 102 implemented using a plurality of servers, one or more client devices 104, and a network 106 communicatively coupling the servers and client device.

Although the client device 104 is illustrated as being implemented by a traditional desktop computer, the client device 104 may be implemented by a variety of different devices. For example, the client device 104 may be configured as a computer that is capable of communicating over the network 106, such as a desktop computer, a mobile station, an entertainment appliance, a set-top box communicatively coupled to a display device, a wireless phone, a game console, a tablet computer, a netbook, and so forth. Thus, the client device 104 may range from a full resource device with substantial memory and processor resources (e.g., personal computers, game consoles) to a low-resource device with limited memory and/or processing resources (e.g., traditional set-top boxes, hand-held game consoles). Additionally, the devices may be representative of one or more devices, e.g., the functionality provided by the service provider may be implemented by a plurality of servers in a server farm as illustrated.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The service provider 102 may be implemented using any suitable type of server that can provide any suitable type of service 108 that can be consumed online. In at least some embodiments, the server or servers can be configured to operate in a so-called "cloud computing" environment. Cloud computing refers to a computing model that enables ubiquitous network access to a shared and virtualized pool of computing capabilities. Such computing capabilities can include, by way of example and not limitation, network, storage, processing, and memory capabilities that can be rapidly provisioned. Cloud computing can encompass a variety of cloud providers, as well as several infrastructure-as-a-service (Iaas) and platform-as-a-service (Paas) solutions.

Specifically, the service provider 102 may be implemented as, by way of example and not limitation, an application server that is dedicated to making services 108 available, such as by running certain software applications (e.g., business-related applications), a catalog server that can provide a central search point for information across a distributed network, a communications server that provides a computing platform for communication networks, a computation server intended for intensive computations (e.g., scientific calculations), a database server that provides database services to other computer programs or computers, a fax server that provides fax services for client devices, a file server that provides remote access to files, a game server that enables video game clients to connect in order to play online games, a mail server that handles transport of and access to e-mail and other communication services, a name server that provides name resolution, a print server that provides print services, a proxy server that acts as an intermediary for requests from clients seeking resources from other servers, a sound server that provides multimedia broadcasting or streaming, a Web server that allows a HTTP clients to connect in order to send commands and receive responses along with data contents, and the like. As such, the number and variety of services 108 offered by the service provider 102 can vary greatly.

The individual servers can include a service testing system 110, which is representative of a variety of functionality. An example of this functionality is designed to utilize machine learning techniques to classify security events based on the concept of behavior change detection or "volatility." Behavior change detection is utilized, in place of a pre-defined patterns approach, to look at a system's behavior and detect any variances from what would otherwise be normal operating behavior. In operation, the machine learning techniques are utilized as an event classification mechanism. The machine learning techniques are iterative and continue to learn over time. This constitutes an improvement over rule-based systems that require new rules to be authored whenever the system changes. Through machine learning techniques, the manual process typically associated with rule-based systems is eliminated in favor of an automatically-updatable and continuously-learning solution.

Another example of this functionality involves techniques usable to infer templates 112 used by services 108 to publish documents 118 (e.g., web pages) through use of a template inference module 114 that uses machine learning. For example, many online content portals use a small number of templates 112 to publish a large amount of documents 118, e.g., five thousand templates 112 to support eighty million URLs and corresponding documents 118 that are made available to communication modules 120 (e.g., browsers, network enabled applications, and so on) of the client device 104. While this approach minimizes the amount of code necessary to provide the services 108, conventional scanners and test tools that do not have insight into server-side code are forced to treat each document 118 (e.g., templated webpage) as an individual codebase because of differences in content in the documents 118. This leads to significant duplicate testing of the underlying code and corresponding resource usage and time involved in testing the services 108 as previously described.

The template inference module 114 is thus representative of functionality to reduce a number of services 108 (e.g., content or other webpages) scanned for a complete test pass via the application of machine learning techniques to infer template 112 usage by the services 108. For example, the template inference module 114 may take as an input a set of known templated documents 116, e.g., webpages. The template inference module 114 also takes as an input documents 118 associated with respective uniform resource locators (URLs) of the services 108 to be tested.

The template inference module 114 then employs template inference techniques to symbolically represent the template 112 that was likely used to create the documents 118 of the corresponding URLs as an inferred dataset, i.e., to structure content included in the documents 118 which is referred to as a meta-domain descriptor in the following. The dataset is inferred in that the template 112 used for the corresponding document of the services 108 at the URL is inferred from a structure of the document 118.

Next, the template inference module 114 clusters services 108 (e.g., URLs of the services) based on likely usage of similar templates 112 to create respective documents 118. The clustering may be performed in a variety of ways. For example, the template inference module 114 may utilize machine learning techniques (e.g., neural networks) that are applied to the inferred dataset. Overlaps in the inferred dataset are located to form the clusters using the known templated documents 116 as a ground truth.

In one or more implementations, duplicates in the clusters are removed and the de-duplicated data is again processed by the template inference module 114. This may be performed to validate quality in that documents 118 and associated templates 112 are to have the same results, no matter what the content differences are between the documents 118. Additionally, matched and mismatched results may be fed back into the template inference module 114 to continuously improve accuracy.

Identification of duplicates may then be used by the service testing system 110 to improve testing efficiency. For example, the service testing system 110 may then select a subset of documents 118 from associated services 108 within a common cluster for testing, e.g., one or a few, and thus greatly reduce an amount of testing performed, e.g., from eighty million to tens of thousands in the example above. Implementation examples below describe techniques to infer templates through use of a meta-domain descriptor to recognize structural components of a page independent of content is described in the following.

In this way, a user of the client device 104 may interact with a communication module 120, which is representative of functionality of the client device 104 to interact with the network 106, and hence interact with various online services 108 provided by the service provider 102 in a manner having increased reliability and security.

Various examples described above and below can be implemented utilizing a computer-readable storage medium that includes instructions that enable a processing unit to implement one or more aspects of the disclosed methods as well as a system configured to implement one or more aspects of the disclosed methods. By "computer-readable storage medium" is meant all statutory forms of media.

Accordingly, non-statutory forms of media such as carrier waves and signals per se are not intended to be covered by the term "computer-readable storage medium".

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable storage media. The features of the volatility-based classifier are platform-independent, meaning that the techniques may be implemented on a variety of commercial computing platforms having a variety of processors.

Figure 6:
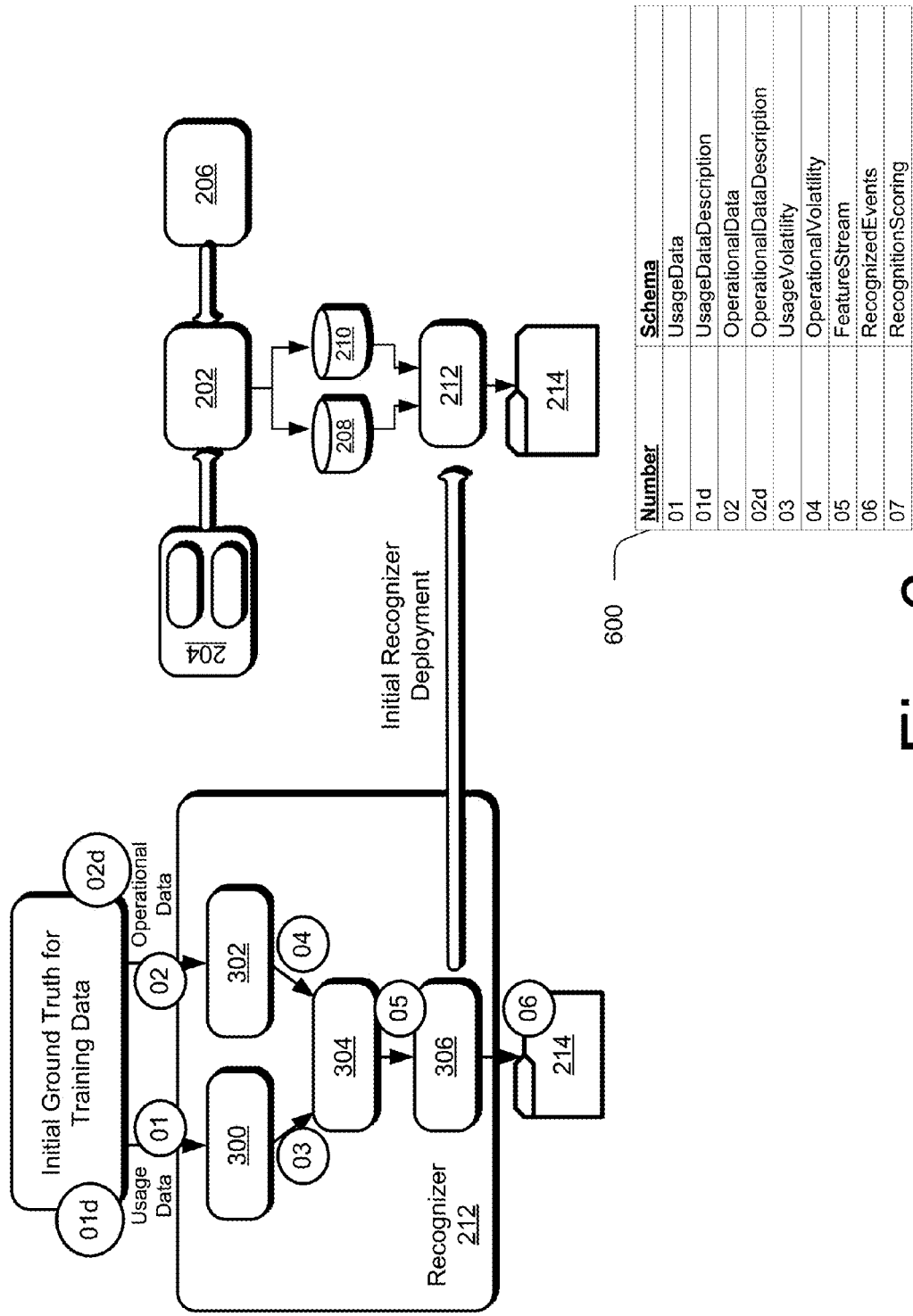
FIG. 6 illustrates aspects of how an example schema is mapped to an example system in accordance with one or more implementations.
Figure 7:
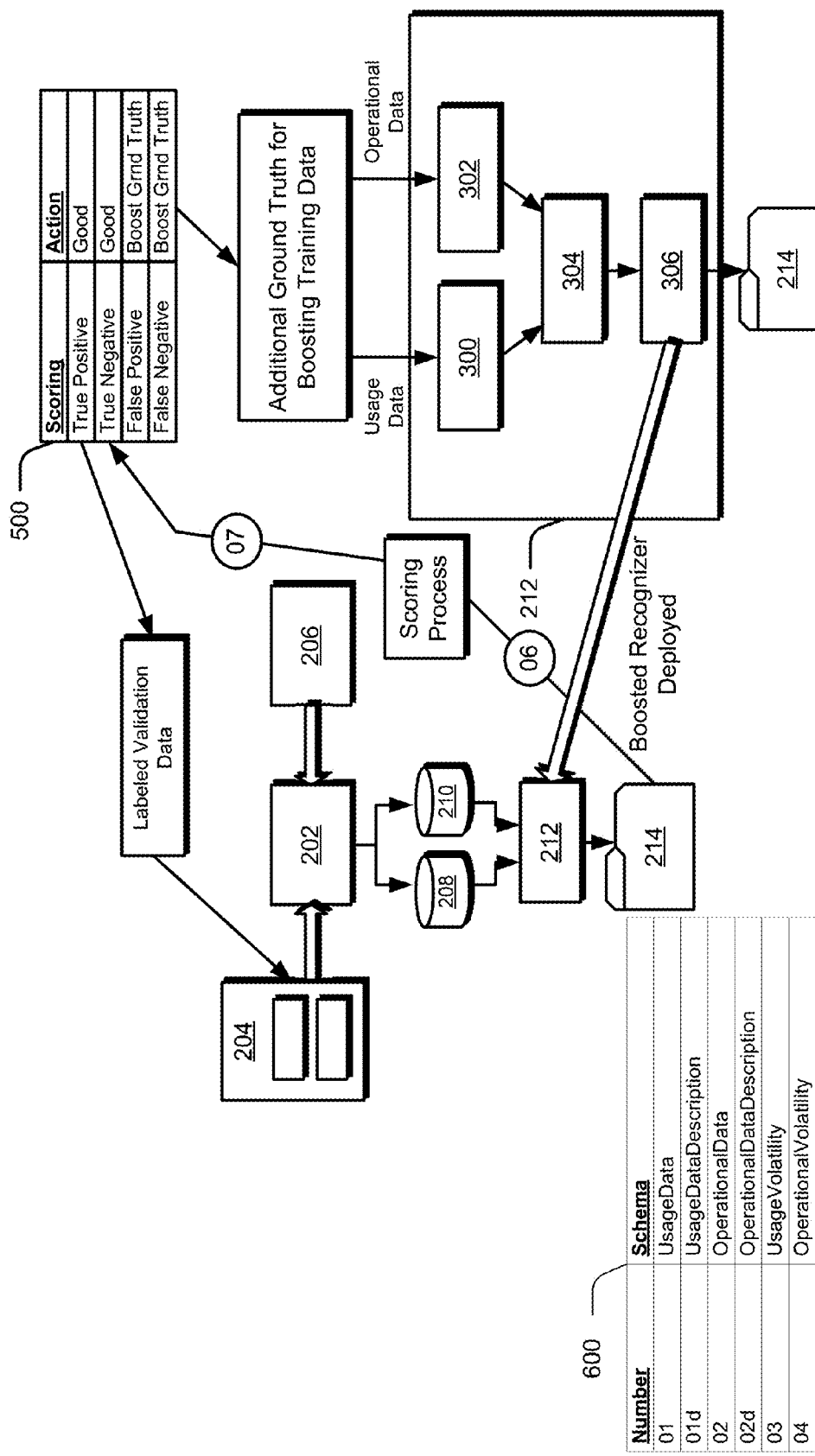
FIG. 7 illustrates aspects of how the example schema is mapped to the example system in accordance with one or more implementations.

Having considered an example environment in which various examples of the service testing system 110 can be employed, consider now preliminarily, an example schema that defines data flow between modules that are described below. It is to be appreciated and understood, however, that the schema about to be described constitutes but one example of a schema and is not to be used to limit application of the claimed subject matter. Near the end of this document, FIGS. 6 and 7 diagrammatically relate this schema to the system that is described just below.

Example Schemas

The schemas about to be discussed describe the data flows through a pipeline of processing modules for the volatility-based classifier. The schemas are first described, followed by a discussion of the various processing modules and how data described by the schemas flows through the processing modules.

"UsageData" is an open schema for usage data that describes how users interact with a particular service, e.g., online service requests to a particular web site, such as search queries in Bing.com.

"UsageDataDescription" is a schema for metadata about the UsageData. The metadata describes the UsageData in some particular way.

"OperationalData" is an open schema for the operational data for the datacenter hosting the services. OperationalData can include, by way of example and not limitation, aggregated CPU utilization, network traffic, memory usage, and the like.

"OperationalDataDescription" is a schema for metadata about the operation data. This metadata describes the OperationalData in some particular way.

"UsageVolatility" is an open schema for a time series with an indicated volatility of usage data. This can, for example, be a derivative for numerical features (like number of requests) or an open string capturing classes of changes, e.g., a string to capture that there are rendering differences in a web page within the last time period.

"OperationalVolatility" is an open schema for a time series with indicated volatility of operational data. As with the usage volatility, this can, for example, be a derivative for numerical features (like CPU utilization), or any other type of data that can summarize volatility within the target interval, e.g., categorical data, binary data or even null, in case the data was not captured.

"FeatureStream" is an open schema that captures the unified and correlated aggregation of both usage volatility and operational volatility in a time series bounded to predefined intervals (days, hours, minutes, seconds, milliseconds, etc.).

"RecognizedEvents" is an open schema that is used for the generated recognized events. Those are the points in time when usage and operational volatility deviate from historical data, based on annotated training data.

"RecognitionScoring" is an open schema that is used for the output of the scoring process of the recognized events against a so-called labeled "ground truth".

Having considered example schemas in accordance with one or more embodiments, consider now a discussion of the tools and processes for training a so-called "recognizer" for various events.

Training a Recognizer

This section describes how a "recognizer" of the service testing system 110 of FIG. 1 can be initially trained through machine learning techniques.

In the illustrated and described embodiments, the tools and processes that are utilized for training a recognizer include, by way of example and not limitation include:

(1) a service that generates synthetic attacks;
(2) data streams that capture both usage and operational data;
(3) processor modules for computing usage data volatility and operational data volatility;
(4) a correlation module for computing correlation of time series streams from usage volatility and operational volatility;
(5) a machine learning training framework for data clustering, classification, and regression and also usable to infer template usage; and
(6) a machine learning runtime environment.

Figure 2:
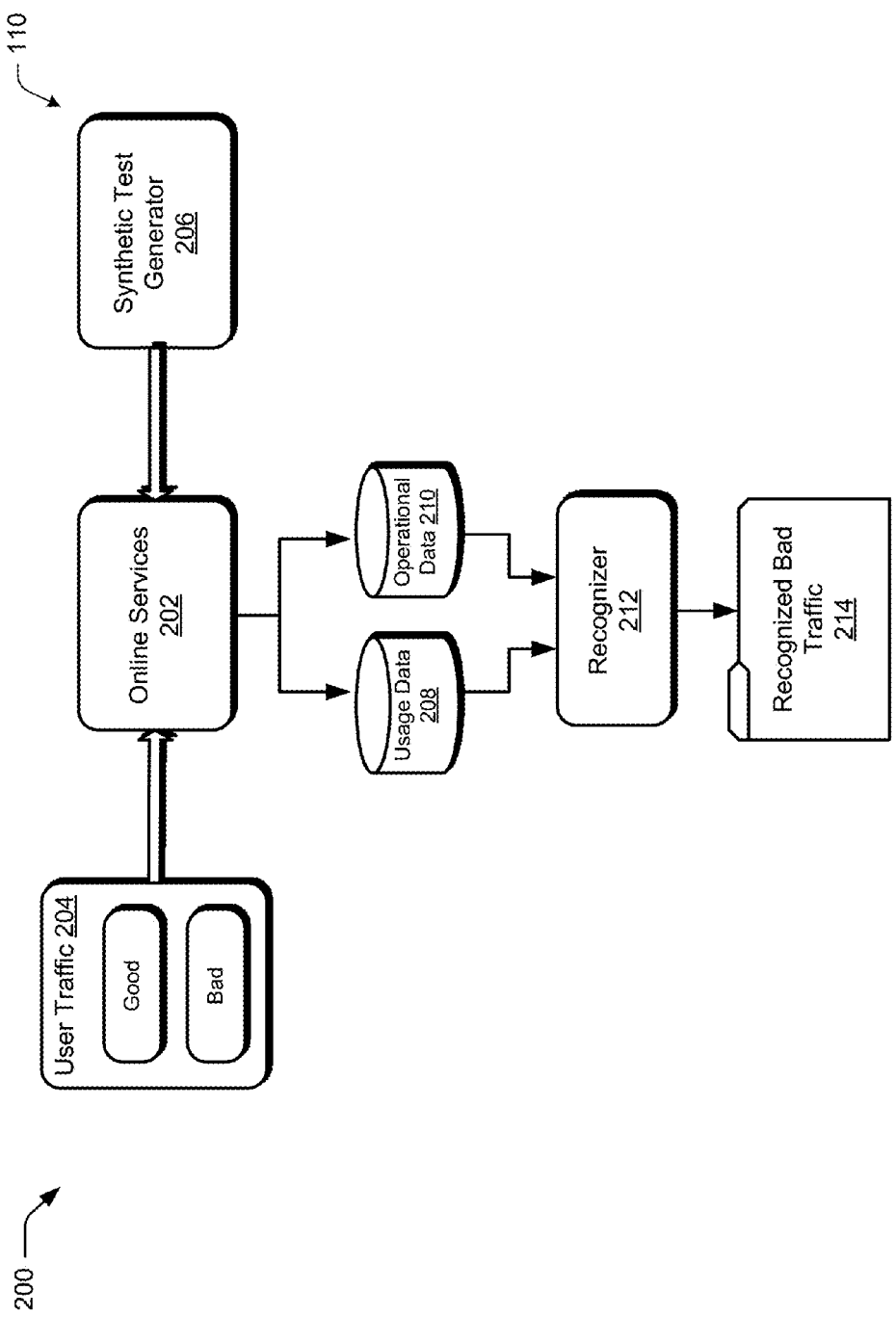
FIG. 2 illustrates an example system in accordance with one or more implementations.

As an example, consider FIG. 2 which illustrates an example system in accordance with one or more embodiments of the service testing system 110 of FIG. 1 generally at 200. The system 200 includes one or more online services 202, examples of which are provided above. In addition, system 200 includes a user traffic module 204, a synthetic test generator 206 (implementable as a module), usage data 208, operational data 210, a recognizer 212 (also implementable as a module) and recognized bad traffic 214. The recognized bad traffic 214 constitutes recognized events at points in time where usage and operational volatility deviate from historical data, based on training data described below.

The user traffic module 204 is representative of functionality associated with the user traffic with respect to a particular online service 202. Specifically, user traffic can constitute "good" traffic which typifies normal user interactions. These normal user actions would be those typically associated with how a user normally consumes or otherwise interacts with an online service. The user traffic can also constitute "bad" user traffic. Bad user traffic constitutes traffic that is otherwise not normal, including attack-type traffic, malicious traffic, and other suspicious interactions.

The synthetic test generator 206 of the service testing system 110 is used to generate synthetic attacks on the online service 202. The synthetic attacks can take any suitable form and, in at least some implementations, can be a function of the type of online service that is provided. The synthetic test generator 206 can be used, for example, to generate special attack strings, inject attack code in various URLs and parameters discovered from various logs associated with online service. Many times, these known attacks can generate several million requests per day on an online service 202.

Responsive to the input received from the user traffic module 204 and the synthetic test generator 206, the online service 202 produces two kinds of data—usage data 208 and operational data 210. The usage data 208 can include any suitable type of data associated with a user's interaction with an online service. So, for example, a log can describe that a user navigated to a webpage at a certain point in time, made a query for a particular kind of cell phone, received results for the query, and then navigated to another webpage.

The operational data 210 describes aspects of the system's hardware and software operations. This can include, by way of example and not limitation, aggregated CPU utilization, network traffic, memory usage, and the like. So, for example, the operational data may describe that a particular machine, over a period of time, went from having a first percentage of its memory free to a second percentage of its memory free.

These two pieces of data—the usage data and the operational data—are correlated and sequenced in a manner described in more detail below. Specifically, the usage data and the operational data are input to and processed by recognizer 212. The recognizer 212 utilizes machine learning techniques, as described in more detail below, to produce the recognized bad traffic 214, i.e., recognized events that constitute departures from historical behavior.

Figure 3:
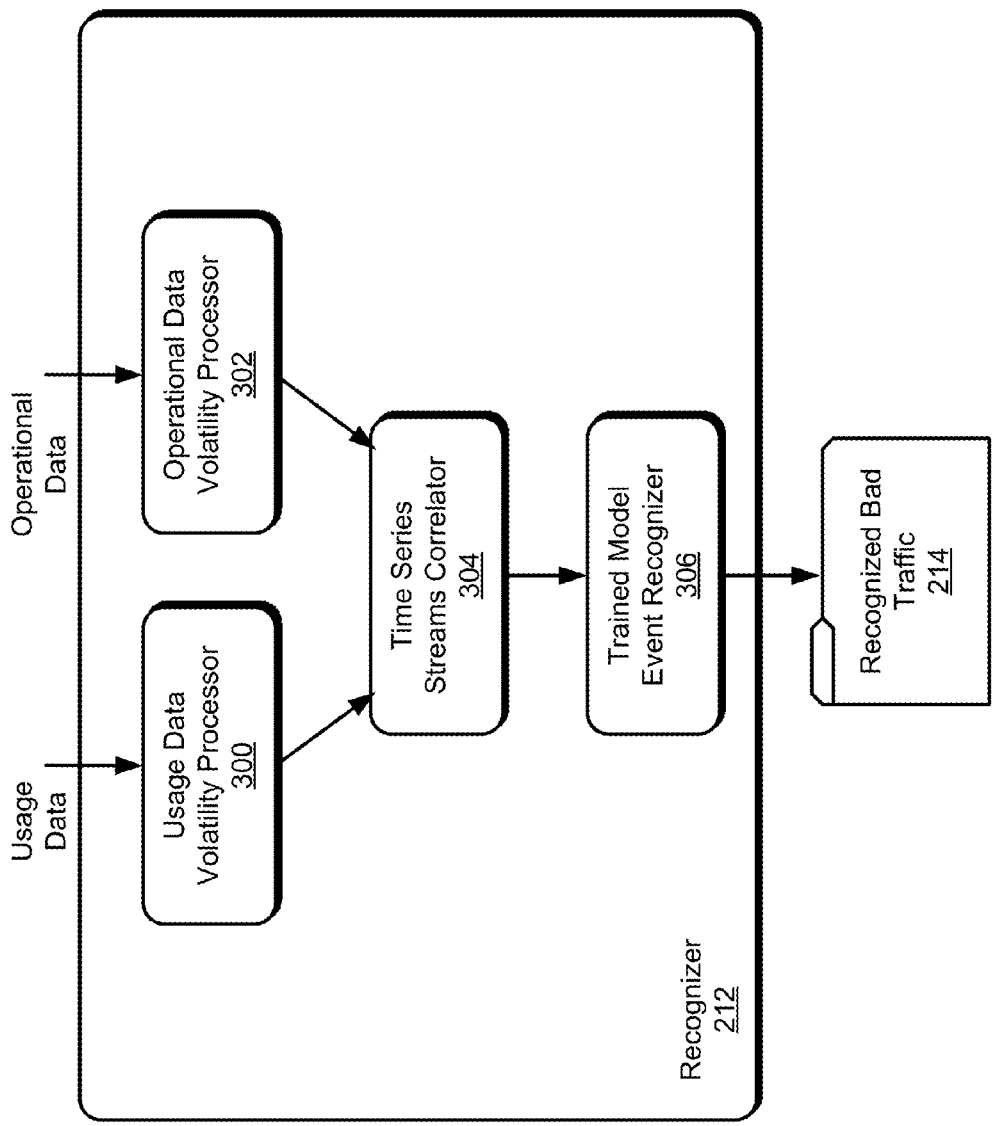
FIG. 3 illustrates an example recognizer in accordance with one or more implementations.

FIG. 3 illustrates an example recognizer 212 in accordance with one or more implementations. In this example, the recognizer 212 is described as being deployed or operational and as illustrated includes a usage data volatility processor 300, an operational data volatility processor 302, a time series streams correlator 304, and a trained model event recognizer 306.

The usage data mentioned above is received and processed by the usage data volatility processor 300. Likewise, the operational data is received and processed by the operational data volatility processor 302. Each of the processors 300, 302 process their respective data to analyze behaviors associated with the data. That is, each of these processors performs behavior change analysis on the data that it receives. Any suitable type of behavior change analysis can be conducted. So, for example, the usage data volatility processor may note that yesterday, a user utilized the online service to conduct a search for tickets to travel to Montréal. The search produced a webpage that was further consumed by the user. Today, however, when a similar search was conducted by a different user, the system behaved quite differently by perhaps producing different search results. Likewise, during this time, the operational data volatility processor 302 may note that yesterday's operational data during this search varied meaningfully in its memory usage as compared to today's similar search.

Based on the processing conducted by processors 300, 302, the observed behavioral change is quantified using a number or value which is correlated to the deviation of the behavioral change that is observed. Any suitable quantification scheme can be used in accordance with one or more embodiments. In at least some embodiments, the behavioral change is quantified using a value between 0 and 1. Quantification of the behavioral change in this manner enables classification of behavioral changes over time. This process produces a time series with user volatility and operational volatility data. But one example of how this can be done is provided below in a section entitled "Behavior Change Analysis for Online Services—Example".

The quantified behavioral change data is provided to the time series streams correlator 304 for processing. The correlator analyzes the data that it receives from the usage data volatility processor 300 and looks to see if any data received from the operational data volatility processor 302 indicates any behavioral change at a corresponding time. So, for example, if a usage behavioral deviation occurred at a particular time, the time series streams correlator 304 examines data from that time received from the operational data volatility processor 302 to ascertain whether operations were normal or varied in some meaningful degree, e.g., did CPU usage jump from 50% to 100%? Thus, correlation of the volatility of usage data and operational data can help to identify whether a particular behavioral deviation was even more out of the ordinary. This process produces a feature stream that captures the unified and correlated aggregation of both usage volatility and operational volatility in a time series bounded to a pre-defined interval.

The feature stream is provided to the trained model event recognizer 306. The recognizer 306 is configured to recognize, from the feature stream that it receives, normal versus abnormal behavior. So, for example, at a given time the operational data may indicate a behavioral change associated with a machine being turned off. When the correlated time series stream is examined, the trained model event recognizer 306 may note that the usage data associated with that time is normal. Accordingly, as of this time, the system was operating normally. However, the time series stream may indicate an operational data variance along with usage data that is out of the normal operating range. In this instance, this is recognized as bad traffic, i.e. a recognized event in which usage and operational volatility deviate from historical data, and a notification can be generated by the system to cause further investigation to be performed.

Behavior Change Analysis for Services—Example

Any issue in any service (e.g., security, privacy, regression, and the like) over time can be considered as a change in behavior. One example of a service is an online or Web-based service. In the approach described below, an initial behavior phase is utilized to collect an initial behavior for a service over a period of time. An exercise behavior phase is then utilized to collect an exercised behavior over a different period of time. The initial behavior phase and exercise behavior phase produce two data sets for which a deviation is computed. The deviation can indicate behavior changes and find issues or legitimate mutations.

In one or more implementations, to compute deviations in behavior for services, such as online services, two concepts are utilized—the meta-domain descriptor and matrix execution, each of which is discussed below. These concepts enable a behavior to be "built." Other approaches can also be used without departing from the spirit and scope of the claimed subject matter.

Meta-Domain Descriptor

A meta-domain descriptor describes elements out of context. Consider, for example, applying this concept to "http://www.bing.com," which is an HTML end point. One can see an example of this when extracting out algorithmic search results, e.g., blue links that appear in a search result page. In this instance, account environment factors are not taken into account such as the query, market, language, or any other parameter that can contribute at the context in which the algorithmic results gets manifested. Thus, a meta-domain descriptor (MDD) is a collection of objects described in an independent context which is usable to describe a structure, which may also be used to infer template usage as further described below.

In the illustrated and described example, an MDD object has an extractor and a collection of features. A feature is a collection of actions. Examples of actions for an algorithmic result can include: instances number, order of instances (for a particular context in which order is displayed), page position, and the like.

In the following, let Extractor be represented as "E" and Feature be represented as "F" and Action be represented as "A," then an object can be expressed as the following:

$$O=\{(E,F(i)) \text{ with } i=1 \ldots n\}$$

where F={A(i), with i=1 . . . n}.
Then a meta-domain descriptor can be expressed by MDD={O(i) with i=1 . . . n:O(i) context independent}.

An example of modeling a meta-domain descriptor as XLM data is shown in FIG. 2a (using an example describing the Bing algorithmic result). In this particular example, "algo results" (i.e., the blue links that appear in a search results page which are illustrated in FIG. 2a as included within apostrophes) are described. The meta-domain descriptor essentially describes or defines what an "algo result" means out of context. Here, there is an extractor, features, and actions. The extractor extracts the specific object from a particular page. In this instance, the extractor extracts "algo results." The features assist in defining what a particular behavior means for the "algo results," i.e., the blue links within the apostrophes. In this particular instance, the "algo results" are extracted and the behavior is analyzed. In this example, actions including color, page position for each blue link, and instances information all contribute to the behavior. In this manner, the features define properties that are of interest with respect to a particular service.

To conclude, a meta-domain descriptor is utilized to describe what part of the domain behavior is being examined and analyzed for deviations and is also usable to infer template 112 usage by corresponding services 108 to provide content 118.

Matrix Execution

Matrix execution describes an object context generator and can be thought of as describing the "question" that is to be asked. A matrix execution puts a MDD in various kinds of contexts. A simple example using algorithmic results would be to render them for specific queries, markets, languages, and the like.

In the following, let a context be "C" and expressed by C={O(i) with i=1 . . . n:O(i) context dependent}. Then a matrix execution can be expressed by MTX={C(i), with i= 1 . . . n}. And, subsequently MDD is subset of C. The MTX can be thought of as the mechanism that consumes an MDD.

An example of modeling a matrix execution as XML data is illustrated in FIG. 2b using an example generating Bing contexts. In the illustrated and described example, matrix execution is built on using dynamic parameters. Each parameter replaces one variable from the endpoint value. In this example, there is a parameter "query" having values "Microsoft" and "Johann Sebastian Bach". At runtime, there will be a market "en-US" and a query of "Microsoft" and a query of "Johann Sebastian Bach". Likewise, there will be a market of "en-GB" and a query of "Microsoft" and a query of "Johann Sebastian Bach".

Behavior Collection Initial Phase

Consider now a behavior collection initial phase. Specifically, now that a MTX and MDD have been established, collection of a behavior is described. A MDD is examined in a specific context triggered by MTX. Then the MDD is expressed in a specific context by MDD(MTX)={O(i,C(j)), with i=1 . . . n,j=1 . . . m} where O(i,C(j))={(F(i,C(j)) with i=1 . . . n,j=1 . . . m} than by replacement in the first expression the following expression is obtained: MDD (MTX)={F(i,C(j)), with i=1 . . . n,j=1 . . . m}. So if a finite time period is defined as T={t(1), . . . t(k)} and a feature is collected for a specific context one over this time period, then this may be expressed as follows: F(1,C(1),T)={A(i,C (1),t(j)), with i=1 . . . n,j=1 . . . k}

Figure 3A:
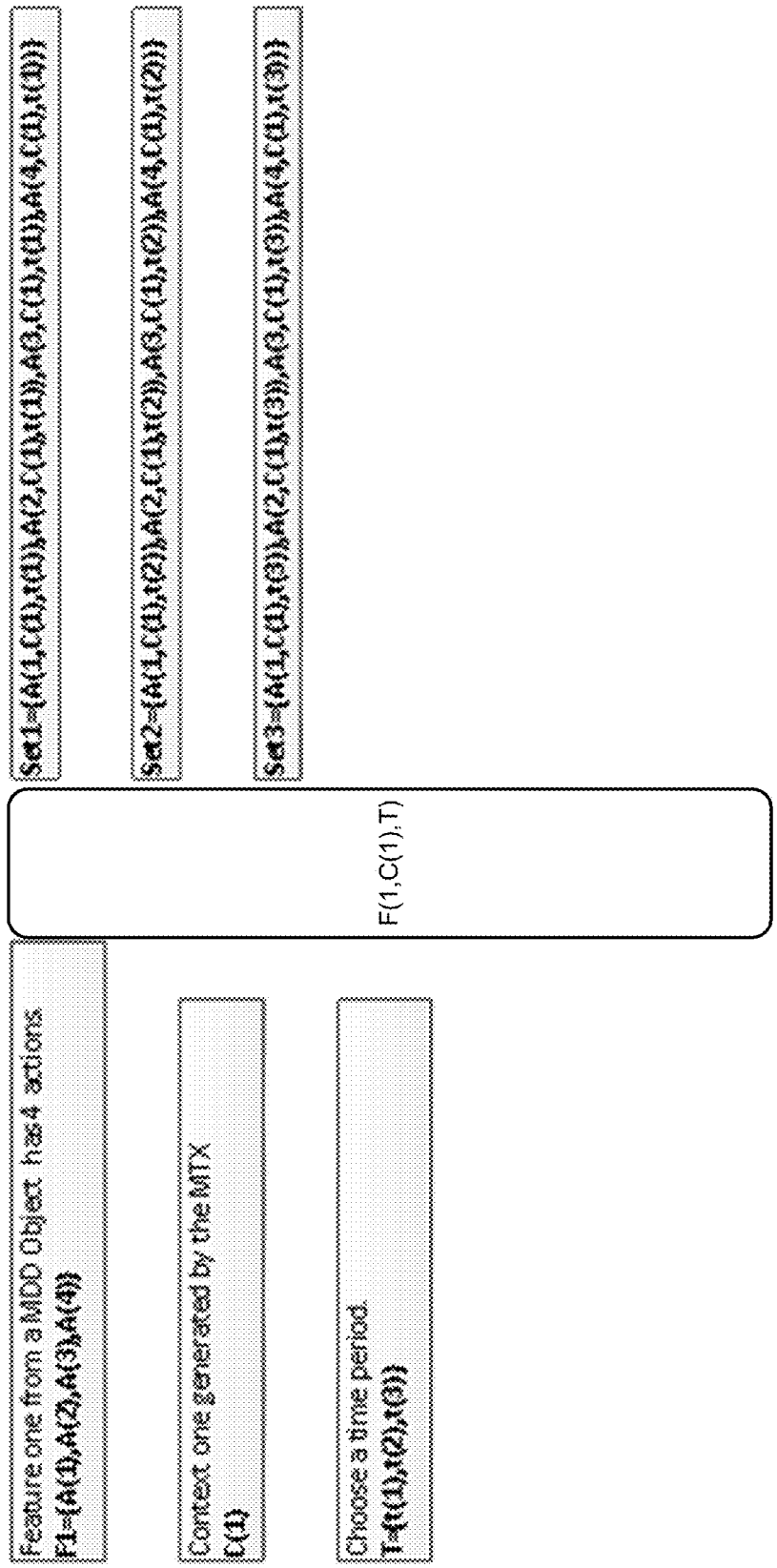
FIG. 3a illustrates aspects of how an object feature can be collected in a specific context over time.
Figure 3B:
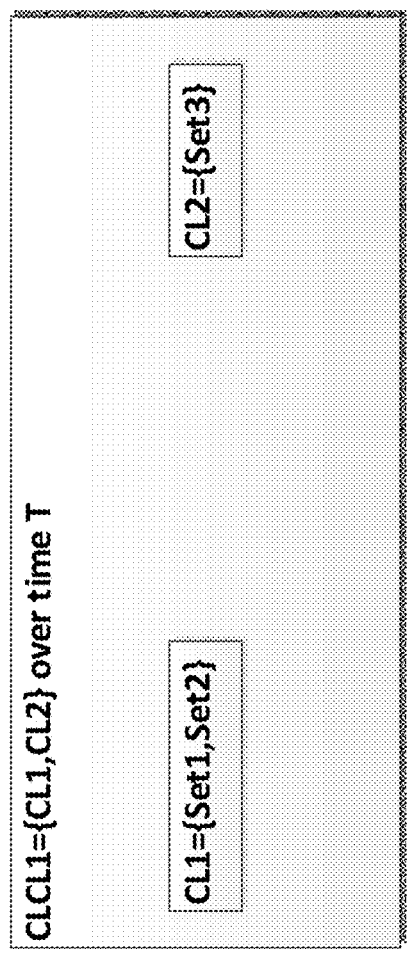
FIG. 3b illustrates an example of clustering the set values from FIG. 3b.

The next step after obtaining those sets of values (for a feature in a specific context over a time period) is to cluster them using a machine learning hierarchical clustering algorithm (e.g., agglomerative approach). Looking at FIG. 3a, Set1, Set2, and Set3 are clustered. So at the end a behavior for an object feature in a specific context over a time period is a cluster of clusters. Let Custer be CL={Set(i), with i= 1 . . . n} and let a cluster of clusters be CLCL={CL(i), with i=1 . . . n}. As illustrated in FIG. 3a, if CL1={Set1,Set2} and CL2={Set3} then CLCL1={CL1,CL2}. As another example, consider FIG. 3b which illustrates an example of clustering the set of values from FIG. 3a.

To conclude, a behavior is a cluster of clusters, computed using the hierarchical clustering algorithm (e.g., agglomerative approach), using data collected for an object feature in specific context over a period of time. This can be expressed as follows: let Behavior be B={CLCL(T)}, where CLCL is the cluster of clusters and T is the time period.

Behavior Collection Exercise Phase

Figure 3C:
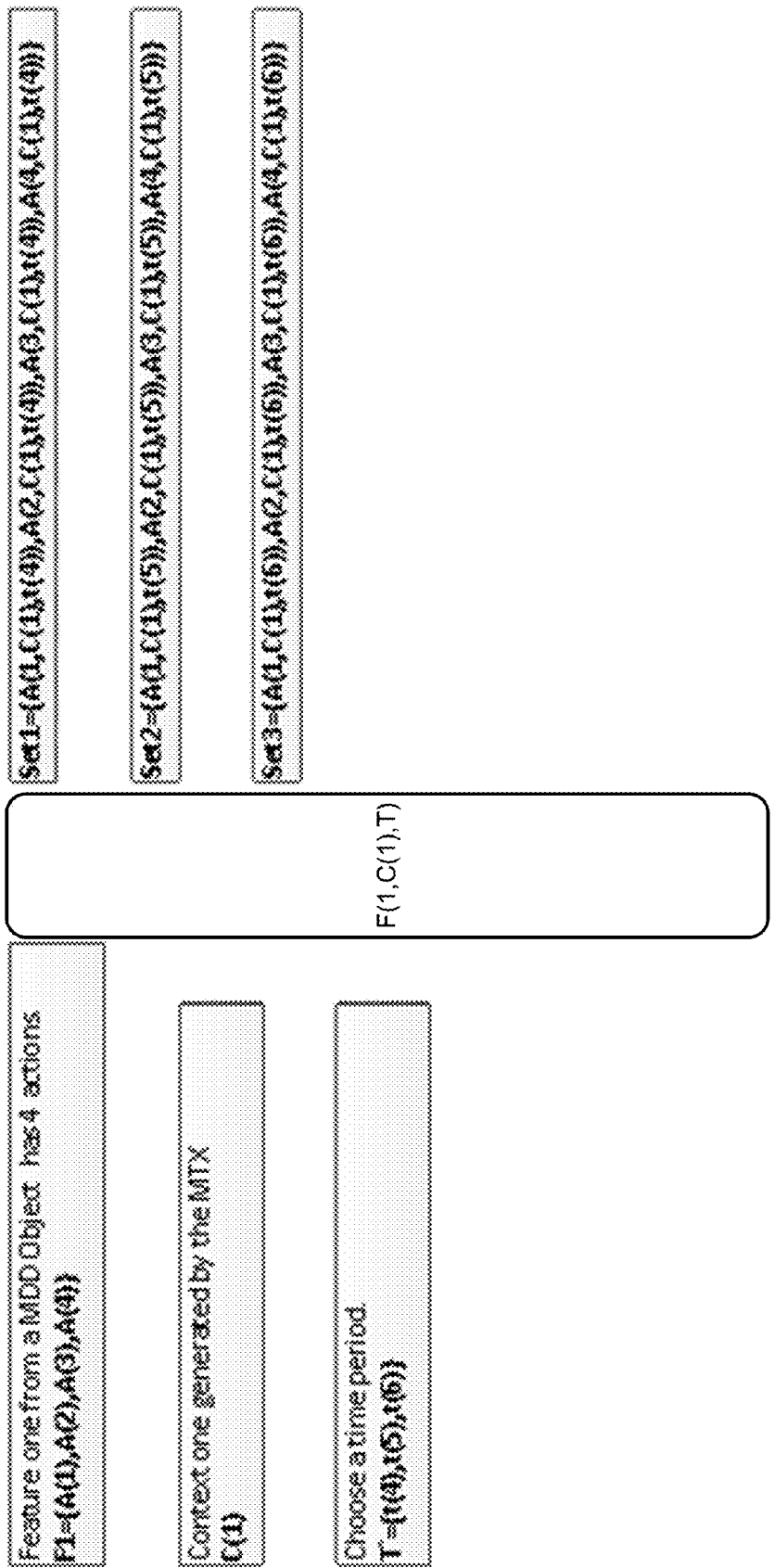
FIG. 3c illustrates aspects of how an object feature can be collected in a specific context over a time period.

Consider now a behavior collection exercise phase in accordance with one or more implementations. This phase is collected and computed in the same way as the initial phase (explained above). The difference here is the time (T). So if for an initial behavior phase a T={t(i), with i=1 . . . n} is chosen then for the exercise phase T'={t(j), with j=n+ m, . . . k and m>=1 and k>m+n} is chosen. In other words, there is no overlap between the two time periods. So in this example of the exercise phase is T does not overlap with the T' from the initial phase. FIG. 3c provides an example of this.

Figure 3D:
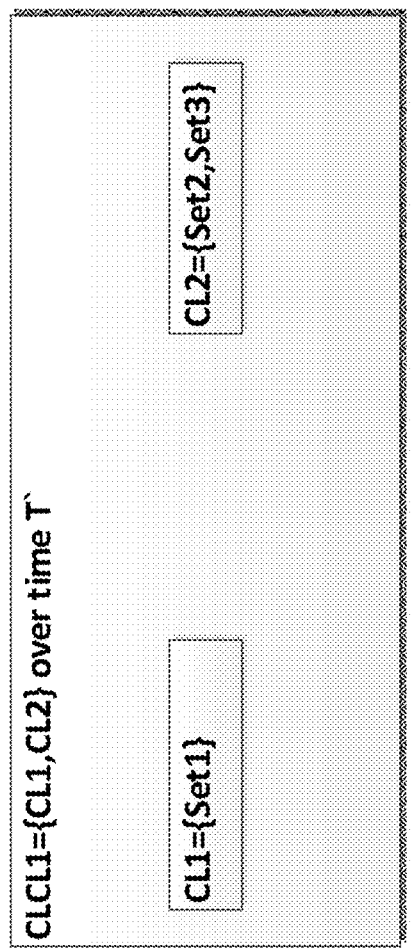
FIG. 3d illustrates an example of clustering the set values from FIG. 3c.

The behavior for the exercise phase is shown in FIG. 3d. The sets are collected over a different period of time therefore the cluster of clusters may look different. It should be noted that the T and T' from initial and exercise behavior intervals are equal to achieve a symmetrical distribution data for each behavior phases. The context is uniformly spread across T, thus if j=i+1 and k=j+1 then t(j)−t(i)=t(k)−t(j) with i,j,k from 1 . . . n.

Computing Behavior Deviations

Figure 3E:
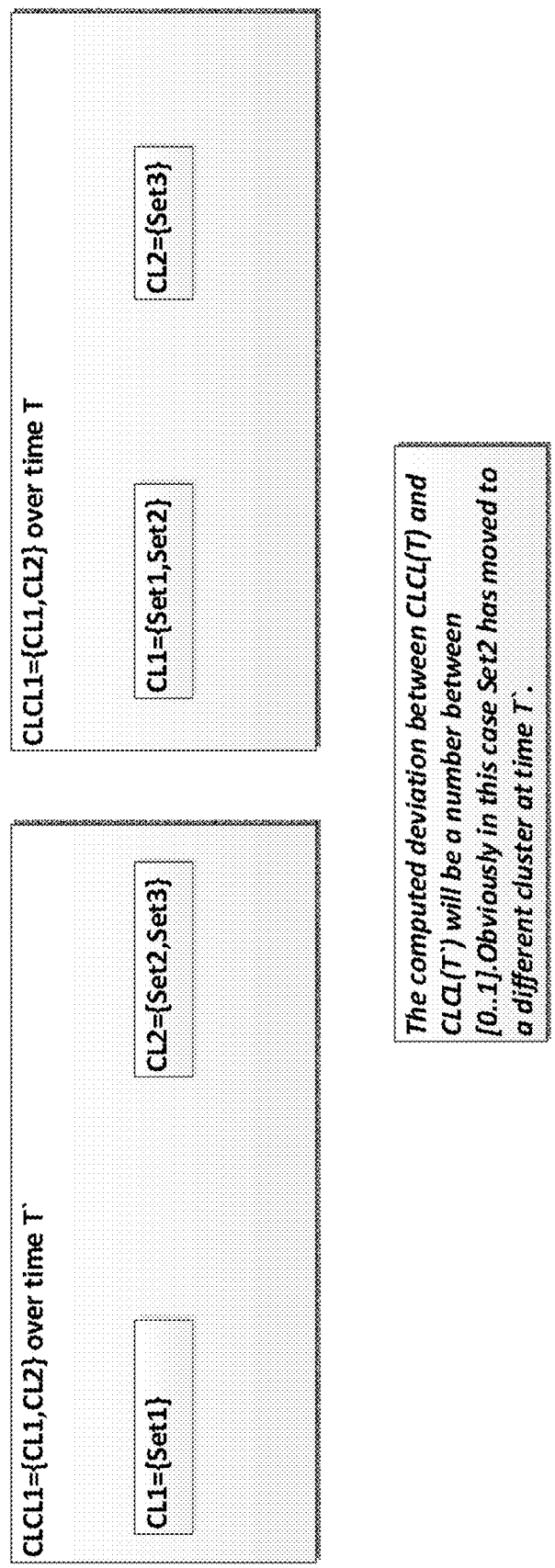
FIG. 3e illustrates a computer deviation in accordance with one or more implementations.

Consider now the computation of behavior deviations in accordance with one embodiment. That is, with the two phases of behavior explained above, the behavior deviation may not be computed. To compute a deviation between two distinct phases of the same behavior, the symmetrical difference is computed between the two clusters of clusters. So a symmetrical difference between:

$$CLCL(T) \Delta CLCL(T') = CLCL(T) \cup CLCL(T') - CLCL(T) \cap CLCL(T'); \text{ or}$$

$$B(T) \Delta B(T') = B(T) \cup B(T') - B(T) \cap B(T')$$

is the actual deviation between the two phases of the same behavior. That is, the symmetrical difference is the union of the two clusters minus the intersection of the two clusters. FIG. 3e illustrates an example of this. B(T)ΔB(T') is greater than or equal to zero and less than or equal to one.

A deviation equal to zero means no change in behavior; consequently a value equal to one means that the behavior has completely changed. Now a decision can be made as to what this deviation means, whether it is an issue or not, and if it is an issue, what kind of issue, e.g., security, regular regression, privacy, and so forth.

By collecting behavior deviations, classifying them, and making the system remember them, issues can be found including security, regular regression, privacy issues. The testing coverage is highly improved, is not highly human dependent as time goes by, and learns as well as is able to identify unknown issues.

Figure 3F:
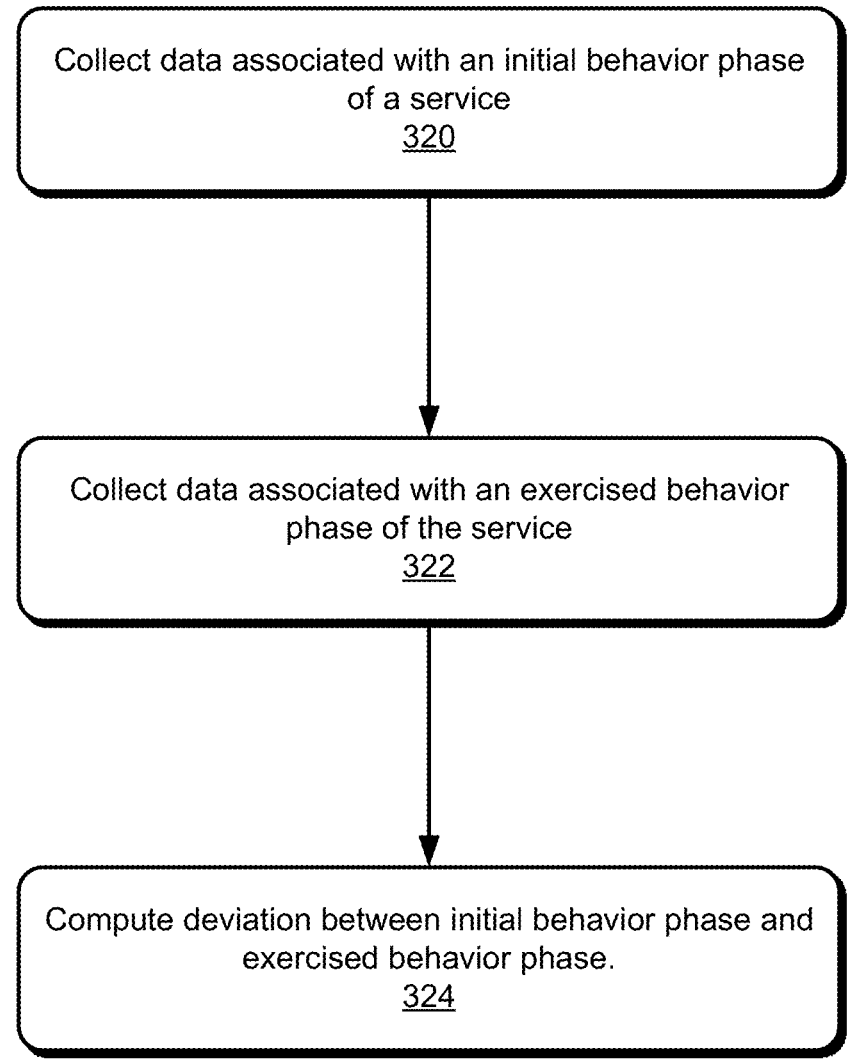
FIG. 3f is a flow diagram that describes steps in a method in accordance with one or more implementations.

FIG. 3f is a flow diagram that describes steps in behavior change detection method in accordance with one or more embodiments. The method can be implemented in connection with any suitable hardware, software, firmware, or combination thereof.

Step 320 collects data associated with an initial behavior phase of a service. Examples of how this can be done are provided above and below.

Step 322 collects data associated with an exercised behavior phase of the service. Examples of how this can be done are provided above and below.

Step 324 computes a deviation between the initial behavior phase and the exercised behavior phase. Examples of how this can be done are provided above.

Figure 3G:
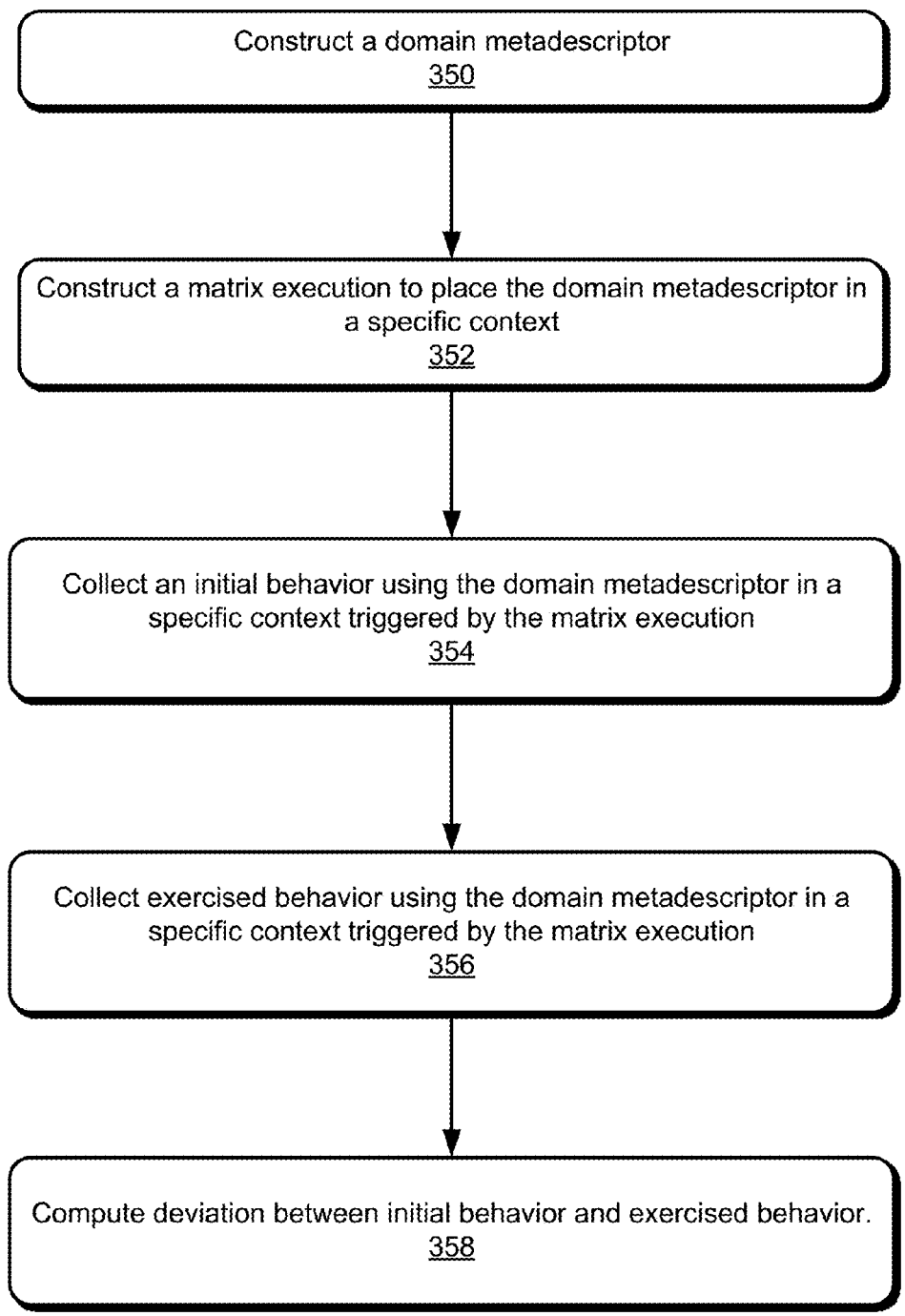
FIG. 3g is a flow diagram that describes steps in a method in accordance with one or more implementations.

FIG. 3g is a flow diagram that describes steps in a behavior change detection method that can be used to implement the method of FIG. 3f in accordance with one or more embodiments. The method can be implemented in connection with any suitable hardware, software, firmware, or combination thereof.

Step 350 constructs a meta-domain descriptor. Examples of how this can be done are provided above.

Step 352 constructs a matrix execution to place the meta-domain descriptor in a specific context.

Step 354 collects an initial behavior using the meta-domain descriptor in a specific context triggered by the matrix execution.

Step 356 collects exercised behavior using the meta-domain descriptor in a specific context triggered by the matrix execution.

Step 358 computes a deviation between the initial behavior and the exercised behavior.

Having considered how a recognizer can be trained and deployed for use, and how behavior change analysis can be conducted, consider now a discussion of an example overall process for connecting various processing modules and performing operational evaluation, including continued training using machine learning techniques.

In Operation

The following discussion describes an iterative process through which security events can be recognized by a recognizer, and machine learning techniques can be employed to automatically and continuously enable the recognizer to further learn how to recognize security events.

Figure 4:
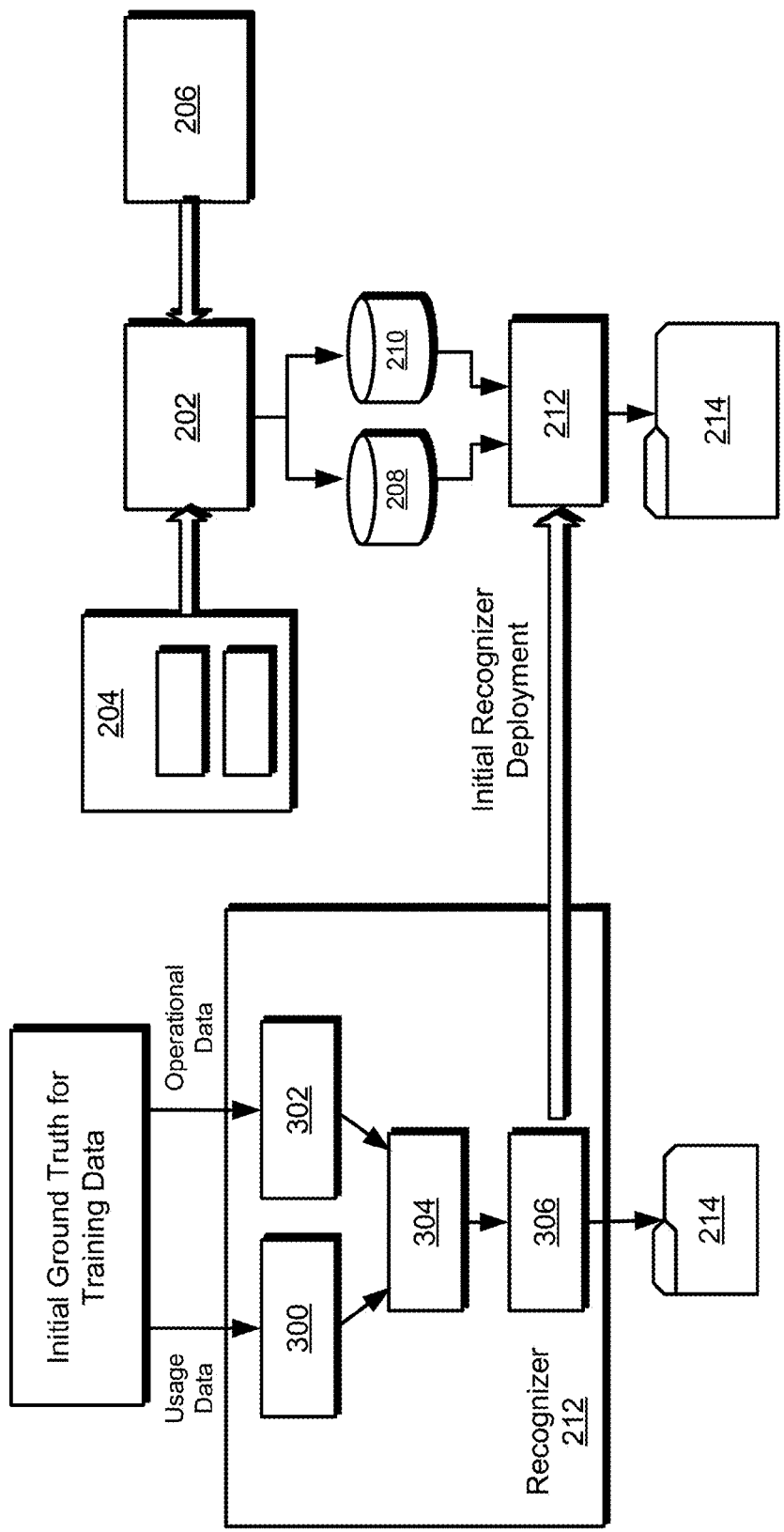
FIG. 4 illustrates the example system undergoing an iterative, machine learning process.
Figure 5:
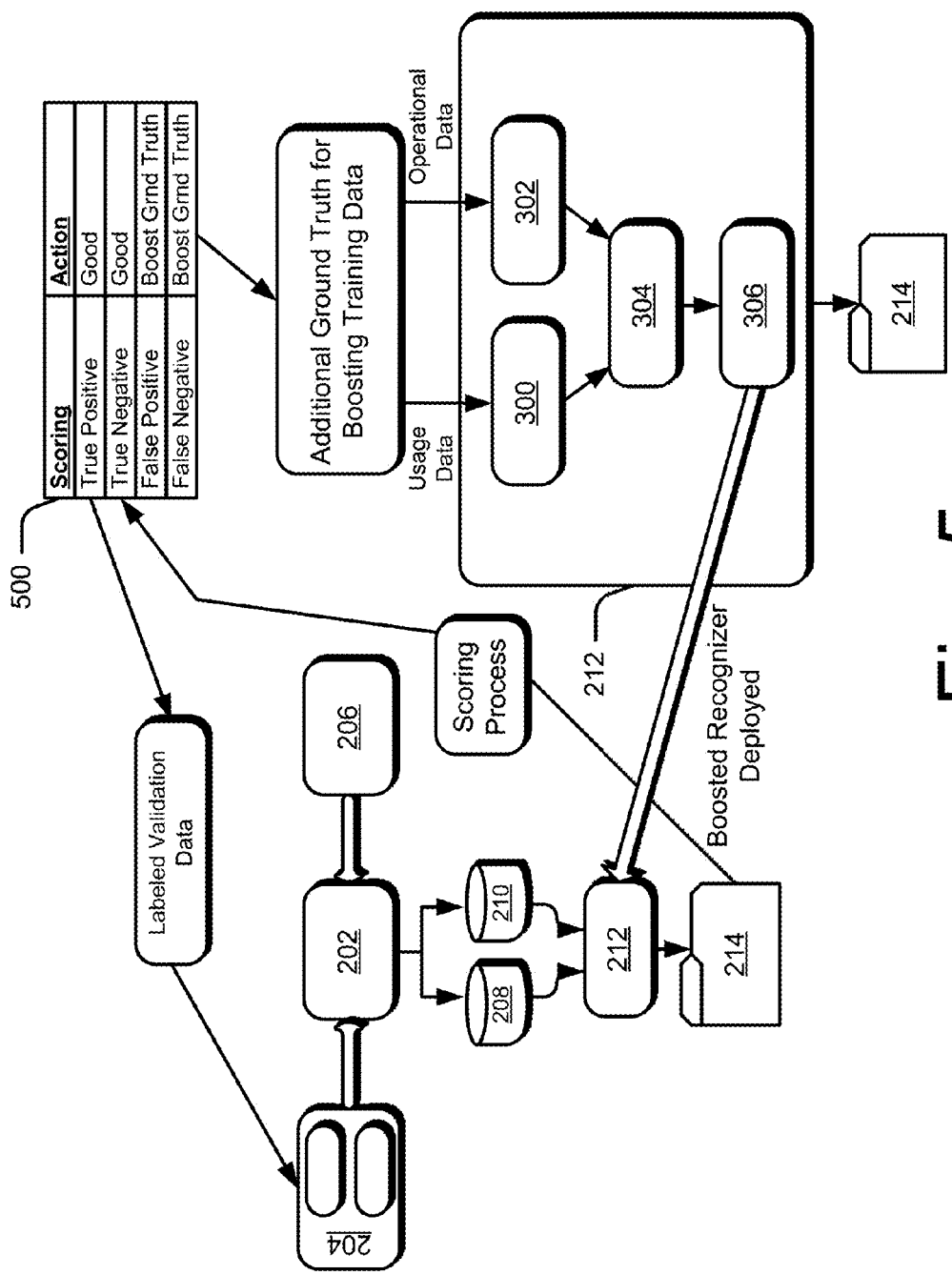
FIG. 5 illustrates the example system undergoing an iterative, machine learning process.

In the discussion that follows, both FIGS. 4 and 5 are utilized. FIG. 4 describes the iterative process from the standpoint of the initial deployment of the recognizer, and FIG. 5 describes how the recognizer can be further trained or "boosted." For purposes of the discussion and because of spacing constraints, the names of the individual elements or modules have been removed. However, the corresponding numerical designators for each element have been carried through from the previous discussion.

Referring to FIG. 4, initial training occurs through the use of what is referred to as the initial ground truth for training data. The initial ground truth includes data that describes, for a particular online service, behaviors that appear to be normal and behaviors that appear to be not normal. This data can be developed over time and can be iteratively boosted by subsequent machine learning techniques, as will become apparent below. This data can reside in the form of both usage data and operational data as described above.

Training of the recognizer 212 using the initial ground truth takes place as described above. Once initially trained, the recognizer can be deployed as indicated by the arrow extending from the trained model event recognizer 306 to the rightmost recognizer 212.

Referring now to FIG. 5, the deployed recognizer, i.e. the left-most recognizer 212, is ready to take part in the iterative, machine learning process. In operation, when the recognizer 212 is online, it receives usage data 208 and operational data 210 and processes the data as described above. Specifically, the usage data 208 and operational data 210 are processed to produce recognized bad traffic or recognized events.

The system then employs an evaluation and scoring process during which time the recognized bad traffic is evaluated and scored for purposes of further honing the system's ability to recognize bad traffic. In this example, the evaluation and scoring process is represented by an arrow that extends from the left most recognized bad traffic 214 to a scoring table 500. Each instance of recognized bad traffic is scored as either a "true positive", "true negative", "false positive", or "false negative".

As will be appreciated by the skilled artisan, "true positives" and "true negatives" are instances where the system is behaving as intended. That is to say, the system is correctly identifying and recognizing bad traffic and not recognizing traffic that is not bad traffic. The instances in which the evaluation and scoring process identifies a "false positive" or a "false negative" constitute instances in which an iterative learning process can be employed to further boost the accuracy with which the system can identify security threats.

Specifically, a "false positive" is a situation in which traffic was identified as bad but, in fact, the traffic was not bad. A "false negative" is a situation in which something should have been identified as bad traffic but was not identified as bad traffic. In both of these instances, an action is taken to boost the ground truth by providing this information back to the recognizer in the form of additional ground truth training data—both usage data and operational data—that can further be processed by the system. This data is also used as validation data for the user traffic module 204. The result of using this additional training data is that the deployed recognizer can be boosted as indicated by the arrow extending from the trained model event recognizer 306 to the leftmost recognizer 212.

This process can continue automatically to develop additional training data that is fed back into the system for both training and validation which, in turn, increases the effectiveness with which the recognizer can perform its operations.

Relating the System to the Schema

Earlier, the notion of a schema was introduced to describe data that is processed by the system as described above. The following discussion relates the schema to the system that was just described above. Similar to the manner in which FIGS. 4 and 5 were discussed, FIGS. 6 and 7 are now provided. Also provided is a table 600 that includes a mapping of numbers to schema elements. These numbers are then encircled and provided onto the diagrams in each figure to show where in the process, data of the schema elements is utilized.

Beginning with FIG. 6, metadata (01d and 02d) associated with usage data and operational data, respectively, is utilized to describe usage data (01) and operational data (02) respectively. The usage data and operational data are processed by their respective volatility processors 300, 302 to produce, respectively, usage volatility (03) and operational volatility (04) time series, as described above. These time series are processed by the time series streams correlator 304 to produce a feature stream (05). The feature stream captures the unified and correlated aggregation of both usage volatility and operational volatility in the time series bounded to pre-defined intervals such as, by way of example and not limitation, days, hours, minutes, seconds, milliseconds, and the like. The feature stream is processed by the trained model event recognizer 306 to produce recognized events (06), referred to as "bad traffic" in the above description.

Shifting now to FIG. 7, the recognized events (06) undergo an evaluation and scoring process to produce recognition scoring data (07) in which the recognized events are scored against the labeled ground truth. The process then continues as described above. That is, the recognizer can be boosted through machine learning techniques that employ identified false positives and false negatives to improve the system's ability to identify bad traffic or recognized events.

Template Identification for Control of Testing

Figure 8:
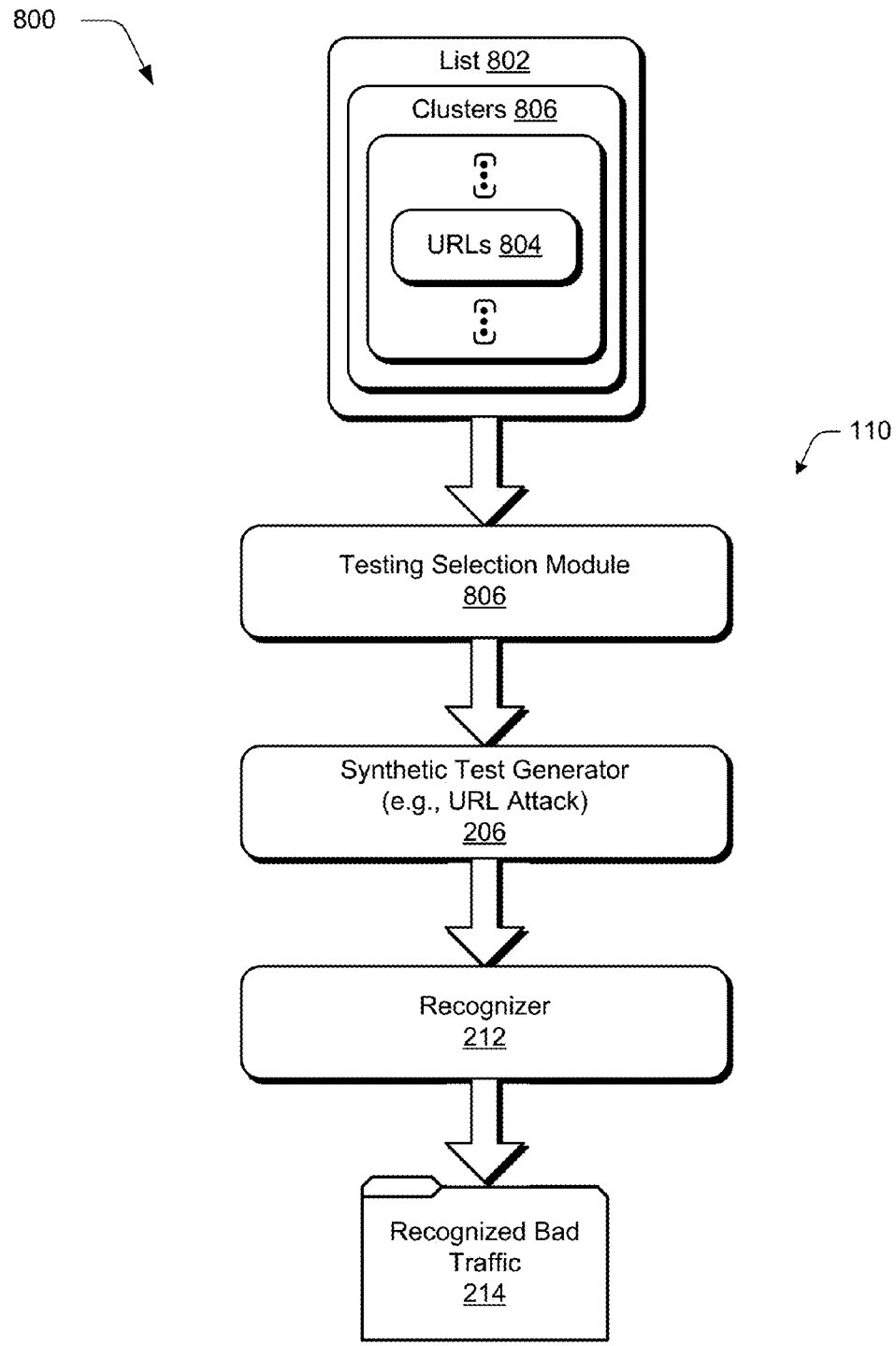
FIG. 8 depicts an example system showing in general how synthetic test generators of FIG. 2 of the service testing system of FIG. 1 are fed to perform testing using clustering based on inferred template usage.

FIG. 8 depicts an example system 800 showing in general how synthetic test generators 210 of FIG. 2 of the service testing system 110 of FIG. 1 are fed to perform testing utilizing inferred template identification. As previously described, synthetic test generators 210 are used in detecting security vulnerabilities and architectural weaknesses in services, such as one or more web applications implemented by the service. In this example, the service testing system 110 may perform black-box testing in which the source code is not known or white-box testing in which the source code is known.

When deciding what to attack from a target, the service testing system 110 starts with a list 802 of URLs 804 provided by a user or automatically as described above to create a target map. The synthetic test generator 210 may then use those URLs 804 as a source to test (e.g., "attack") the target.

In order to improve efficiency of the testing in this example, however, the service testing system 110 performs this testing by taking into account an awareness of clusters 806 that are based on similarities of templates 112 for the URLs 804 that are likely used to arrange content in documents 118.

A testing selection module 806, for instance, may select a subset of URLs 804 contained in a cluster 806. The subset is then used by the synthetic test generator 206 to test URLs of the service provider 102 of FIG. 1. The recognizer 212, as previously described, utilizes machine learning techniques to produce the recognized bad traffic 214, i.e., recognized events that constitute departures from historical behavior. In this way, a number of URLs tested may be greatly reduced, thereby improving efficiency and resource consumption by the service testing system 110 as well as safety as this testing may be performed with greater regularity.

As previously described, matrix execution describes an object context generator and can be thought of as describing the "question" that is to be asked. A simple example using algorithmic results would be to render the results for specific queries, markets, languages, and the like. A meta-domain descriptor (MDD) is utilized to describe what part of the domain behavior is being examined and analyzed for deviations. For example, a meta-domain descriptor may be formed as a collection of objects described in an independent context. Consider, for example, applying this concept to "http://www.bing.com," which is an HTML end point.

The meta-domain descriptor may also be used to describe structural components of a document independent of the content. Thus, the meta-domain descriptor techniques described above are usable as part of template inference as a symbolic representation of the documents 118 independent of content within the documents, which may then be used as a basis to form clusters based on similarity of the descriptors, one to another. A variety of other examples are also contemplated, further discussion of which is included in the following.

Example Procedures

The following discussion describes template identification techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-8 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 9:
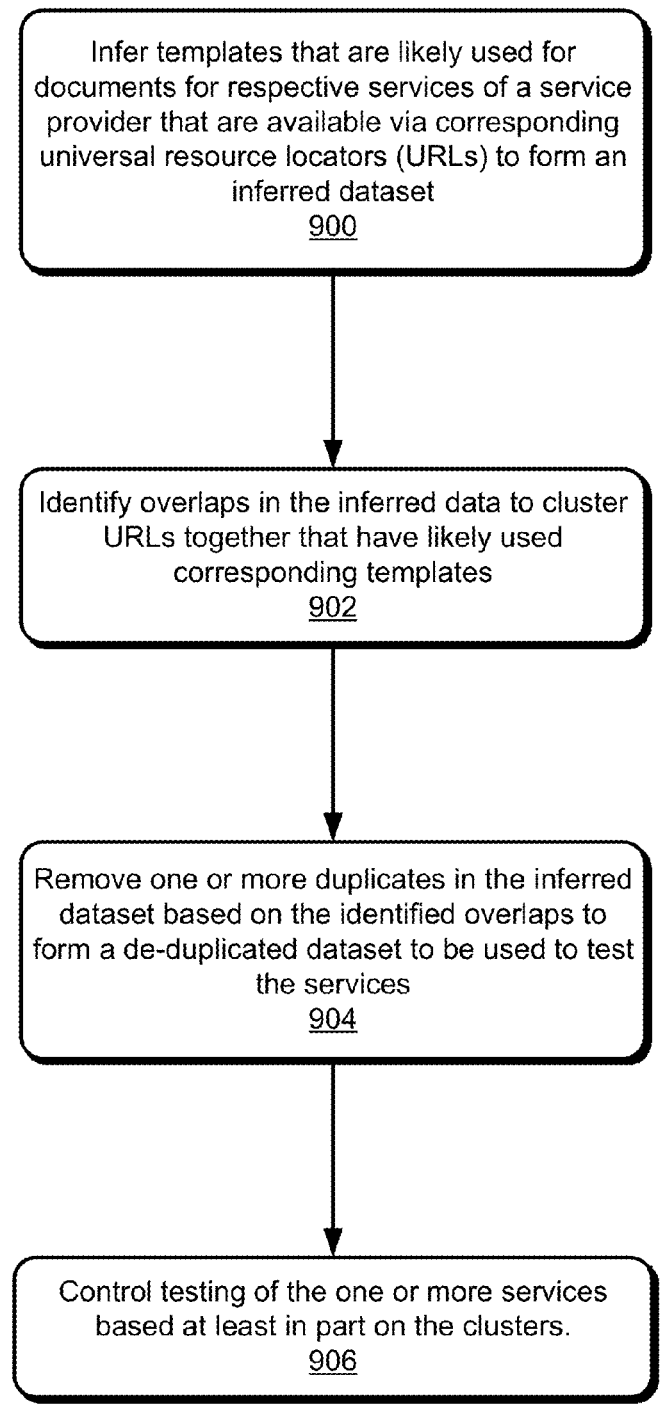
FIG. 9 is a flow diagram that describes steps in a method in accordance with one or more implementations.

FIG. 9 is a flow diagram that describes steps involved in template identification for control of testing. The procedure can be implemented in connection with any suitable hardware, software, firmware, and the like. In at least some embodiments, the procedure or aspects thereof can be implemented by a suitably-configured recognizer, such as the recognizers described above.

Step 900 infers templates, by one or more computing devices, that are likely used for documents for respective services of a service provider that are available via corresponding universal resource locators (URLs) to form an inferred dataset. A template inference technique may be utilized, for instance, that leverages a meta-domain descriptor that describes structure of a document but not content included in the document itself.

Step 902 identifies overlaps in the inferred dataset to cluster services together that have likely used corresponding templates. This may be performed using machine learning in which a set of known templated documents are used as a ground truth to process documents obtained by the services.

Step 904 removes one or more duplicates in the inferred dataset based on the identified overlaps to form a de-duplicated dataset to be used to test the services. Step 906 controls testing of the one or more services based at least in part on the clusters. In this way, redundancies may be removed to improve testing efficiency. Techniques usable to validate quality may also be employed as described above.

Example System and Device

Figure 10:
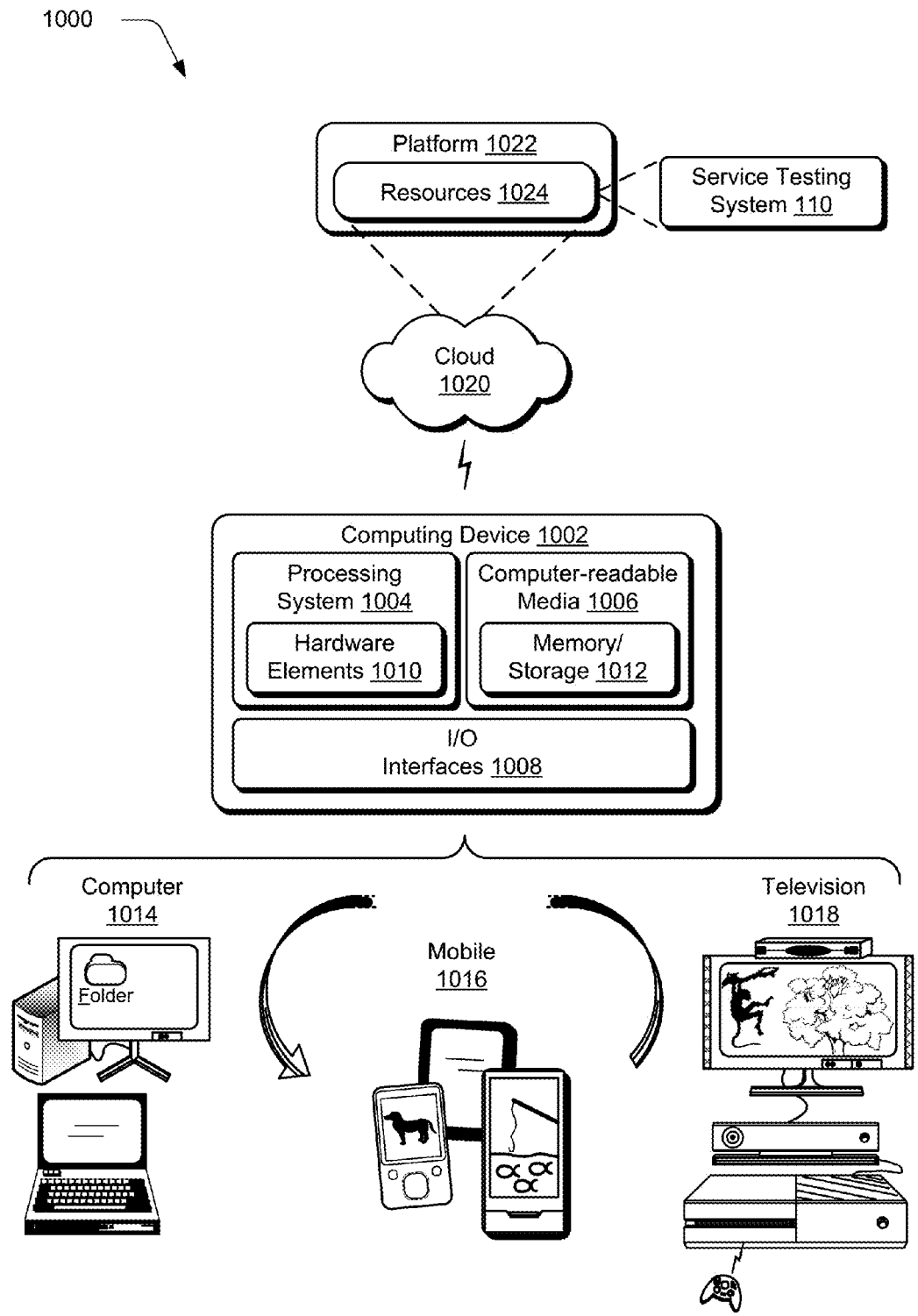
FIG. 10 is an example device in accordance with one or more implementations.

FIG. 10 illustrates an example system generally at 1000 that includes an example computing device 1002 that is representative of one or more computing systems and/or devices that may implement the various techniques described herein, as illustrated through inclusion of the service testing system 110. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and nonvolatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This functionality may also be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

CONCLUSION AND EXAMPLE IMPLEMENTATIONS

Example implementations described herein include, but are not limited to, one or any combinations of one or more of the following examples:

A method to control testing of one or more services by one or more computing devices using inferred template identification, the method comprising inferring templates, by the one or more computing devices, that are likely used for documents for respective services of a service provider that are available via corresponding universal resource locators (URLs) to form an inferred dataset; identifying overlaps by the one or more computing devices in the inferred dataset to cluster services together that have likely used corresponding templates; and controlling testing by the one or more computing devices of the one or more services based at least in part on the clustered services.

An example as described alone or in combination with any of the above or below examples, wherein the inferring includes applying template inference techniques to symbolically represent the likely templates used by the respective services.

An example as described alone or in combination with any of the above or below examples, wherein the applying is performed using a set of known templated documents and the documents obtained from the clustered services, an output of which is the symbolic representations.

An example as described alone or in combination with any of the above or below examples, wherein the identifying of overlaps in the inferred dataset to cluster services together that have likely used corresponding templates is performed using machine learning.

An example as described alone or in combination with any of the above or below examples, wherein the machine learning uses known template documents as a ground truth to process the documents obtained from the clustered services.

An example as described alone or in combination with any of the above or below examples, wherein the inferring uses a meta-domain descriptor that is generated to describe structural components of the documents obtained from the clustered services independent of content included in the documents.

An example as described alone or in combination with any of the above or below examples, wherein the documents are webpages or web documents.

An example as described alone or in combination with any of the above or below examples, further comprising repeating the inferring and the identifying for a subsequent said inferred dataset formed by removing one or more duplicates from the clustered services.

An example as described alone or in combination with any of the above or below examples, wherein the repeating includes at least some duplicate templates that are used to validate quality.

An example as described alone or in combination with any of the above or below examples, of a service testing system comprising: a template inference module implemented at least partially in hardware, the template inference module configured to: infer templates that are likely used for documents for respective services of a service provider that are available via corresponding universal resource locators (URLs) to form an inferred dataset; and identify overlaps by the one or more computing devices in the inferred dataset to cluster services together that have likely used corresponding templates; and a synthetic test generator configured to control testing of the one or more services based at least in part on the clustered services.

An example as described alone or in combination with any of the above or below examples, wherein the templates are inferred by applying template inference techniques to symbolically represent the likely templates used by the respective services.

An example as described alone or in combination with any of the above or below examples, wherein the applying is performed using a set of known templated documents and the documents obtained from the clustered services, an output of which is the symbolic representations.

An example as described alone or in combination with any of the above or below examples, wherein the identifying of overlaps in the inferred dataset to cluster services together that have likely used corresponding templates is performed using machine learning.

An example as described alone or in combination with any of the above or below examples, wherein the machine learning uses known template documents as a ground truth to process the documents obtained from the clustered services.

An example as described alone or in combination with any of the above or below examples, wherein the templates are inferred through use of a meta-domain descriptor that is generated to describe structural components of the documents obtained from the clustered services independent of content included in the documents.

An example as described alone or in combination with any of the above or below examples, of a computing device to infer template usage by services for use in testing, the computing device comprising: one or more processors; and one or more computer-readable storage media comprising instructions stored thereon that, responsive to execution by the one or more processors, causes the one or more processors to perform operations comprising: applying template inference techniques to symbolically represent likely templates used by respective services of a service provider to infer templates that are likely used for documents for the respective services that are available via corresponding universal resource locators (URLs) to form an inferred dataset; identifying overlaps in the inferred dataset to cluster services together that have likely used corresponding templates; and removing one or more duplicates from the inferred dataset based on the identified overlaps to form a de-duplicated dataset to be used to test the clustered services.

An example as described alone or in combination with any of the above or below examples, wherein the applying is performed using a set of known templated documents and the documents obtained from the clustered services, an output of which is the symbolic representations.

An example as described alone or in combination with any of the above or below examples, wherein the identifying of overlaps in the inferred dataset to cluster URLs together that have likely used corresponding templates is performed using machine learning.

An example as described alone or in combination with any of the above or below examples, wherein the machine learning uses known template documents as a ground truth to process the documents obtained from the clustered services.

An example as described alone or in combination with any of the above or below examples, wherein the applying uses a meta-domain descriptor that is generated to describe structural components of the documents obtained from the clustered services independent of content included in the documents.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method to control testing of one or more services by one or more computing devices using inferred template identification, the method comprising:
    inferring templates, by the one or more computing devices, that are likely used for documents for respective services of a service provider that are available via corresponding universal resource locators (URLs) to form an inferred dataset;
    identifying an overlap, by the one or more computing devices, in the inferred dataset to cluster services together that have likely used corresponding templates;
    removing one or more duplicates, by the one or more computing devices, in the inferred dataset based on the identified overlap to form a de-duplicated dataset to be used to test the clustered services; and
    controlling testing, by the one or more computing devices, of the one or more services based at least in part on the clustered services and the de-duplicated dataset.

2. The method of claim 1, wherein the inferring includes applying template inference techniques to symbolically represent the likely templates used by the respective services.

3. The method of claim 2, wherein the applying is performed using a set of known templated documents and the documents obtained from the clustered services, an output of which is the symbolic representations.

4. The method of claim 1, wherein the identifying of overlaps in the inferred dataset to cluster services together that have likely used corresponding templates is performed using machine learning.

5. The method of claim 4, wherein the machine learning uses known template documents as a ground truth to process the documents obtained from the clustered services.

6. The method of claim 1, wherein the inferring uses a meta-domain descriptor that is generated to describe structural components of the documents obtained from the clustered services independent of content included in the documents.

7. The method as described in claim 1, wherein the documents are webpages or web documents.

8. The method as described in claim 1, wherein the removing includes at least some duplicate templates that are used to validate quality.

9. A service testing system comprising:
   a template inference module implemented at least partially in hardware, the template inference module configured to:
      infer templates that are likely used for documents for respective services of a service provider that are available via corresponding universal resource locators (URLs) to form an inferred dataset; and
      identify overlaps by the one or more computing devices in the inferred dataset to cluster services together that have likely used corresponding templates, wherein the identifying includes machine learning; and
   a synthetic test generator configured to control testing of the one or more services based at least in part on the clustered services.

10. The system of claim 9, wherein the templates are inferred by applying template inference techniques to symbolically represent the likely templates used by the respective services.

11. The system of claim 10, wherein the applying is performed using a set of known templated documents and the documents obtained from the clustered services, an output of which is the symbolic representations.

12. The system of claim 9, wherein the machine learning uses known template documents as a ground truth to process the documents obtained from the clustered services.

13. The system of claim 9, wherein the templates are inferred through use of a meta-domain descriptor that is generated to describe structural components of the documents obtained from the clustered services independent of content included in the documents.

14. A computing device to infer template usage by services for use in testing, the computing device comprising:
    one or more processors; and
    one or more computer-readable storage media comprising instructions stored thereon that, responsive to execution by the one or more processors, causes the one or more processors to perform operations comprising:
       applying template inference techniques to symbolically represent likely templates used by respective services of a service provider to infer templates that are likely used for documents for the respective services that are available via corresponding universal resource locators (URLs) to form an inferred dataset;
       identifying overlaps in the inferred dataset to cluster services together that have likely used corresponding templates;
       removing one or more duplicates from the inferred dataset based on the identified overlaps to form a de-duplicated dataset; and
       controlling testing of the one or more services based at least in part on the clustered services and the de-duplicated dataset.

15. The computing device of claim 14, wherein the applying is performed using a set of known templated documents and the documents obtained from the clustered services, an output of which is the symbolic representations.

16. The computing device of claim 14, wherein the identifying of overlaps in the inferred dataset to cluster URLs together that have likely used corresponding templates is performed using machine learning.

17. The computing device of claim 16, wherein the machine learning uses known template documents as a ground truth to process the documents obtained from the clustered services.

18. The computing device of claim 14, wherein the applying uses a meta-domain descriptor that is generated to describe structural components of the documents obtained from the clustered services independent of content included in the documents.

* * * * *